(12) United States Patent
Ishikawa

(10) Patent No.: US 7,562,842 B2
(45) Date of Patent: Jul. 21, 2009

(54) REEL

(75) Inventor: Ren Ishikawa, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 11/907,180

(22) Filed: Oct. 10, 2007

(65) Prior Publication Data

US 2008/0087760 A1    Apr. 17, 2008

(30) Foreign Application Priority Data

Oct. 12, 2006    (JP) .............................. 2006-278866

(51) Int. Cl.
    *B65H 75/18*    (2006.01)
(52) U.S. Cl. .................... 242/610.4; 242/348
(58) Field of Classification Search ................ 242/348, 242/348.2, 608, 610.4, 613.4
    See application file for complete search history.

(56) References Cited

U.S. PATENT DOCUMENTS 4,807,826 A * 2/1989 Iwahashi .................... 242/608
6,983,908 B2 * 1/2006 Hiraguchi ................... 242/348
7,168,655 B2 * 1/2007 Morita ..................... 242/348.2
7,347,397 B2 * 3/2008 Ishikawa et al. ............. 242/348
2003/0226924 A1 * 12/2003 Morita ..................... 242/613.4

FOREIGN PATENT DOCUMENTS

JP    2004-14022 A    1/2004
JP    2005-116163 A    4/2005

* cited by examiner

*Primary Examiner*—William A Rivera
(74) *Attorney, Agent, or Firm*—Sughrue Mion, PLLC

(57) ABSTRACT

Provided is a reel capable of improving the rigidity of the hub and maintaining the tape characteristics. A single resin layer 36 lying below an aluminum ring 112 in an axial direction of the reel hub 32 and having a wall thickness $t_2$ of 0.8-1.7 mm can suppress the partial rigidity reduction of the reel hub 32. This can suppress the partial characteristic deterioration of a recording tape T wound on the reel hub 32 (partial broadening of the width of the recording tape T, etc.). Besides, crack occurrence can be reduced in the single resin layer 114 of the reel hub 32.

8 Claims, 20 Drawing Sheets

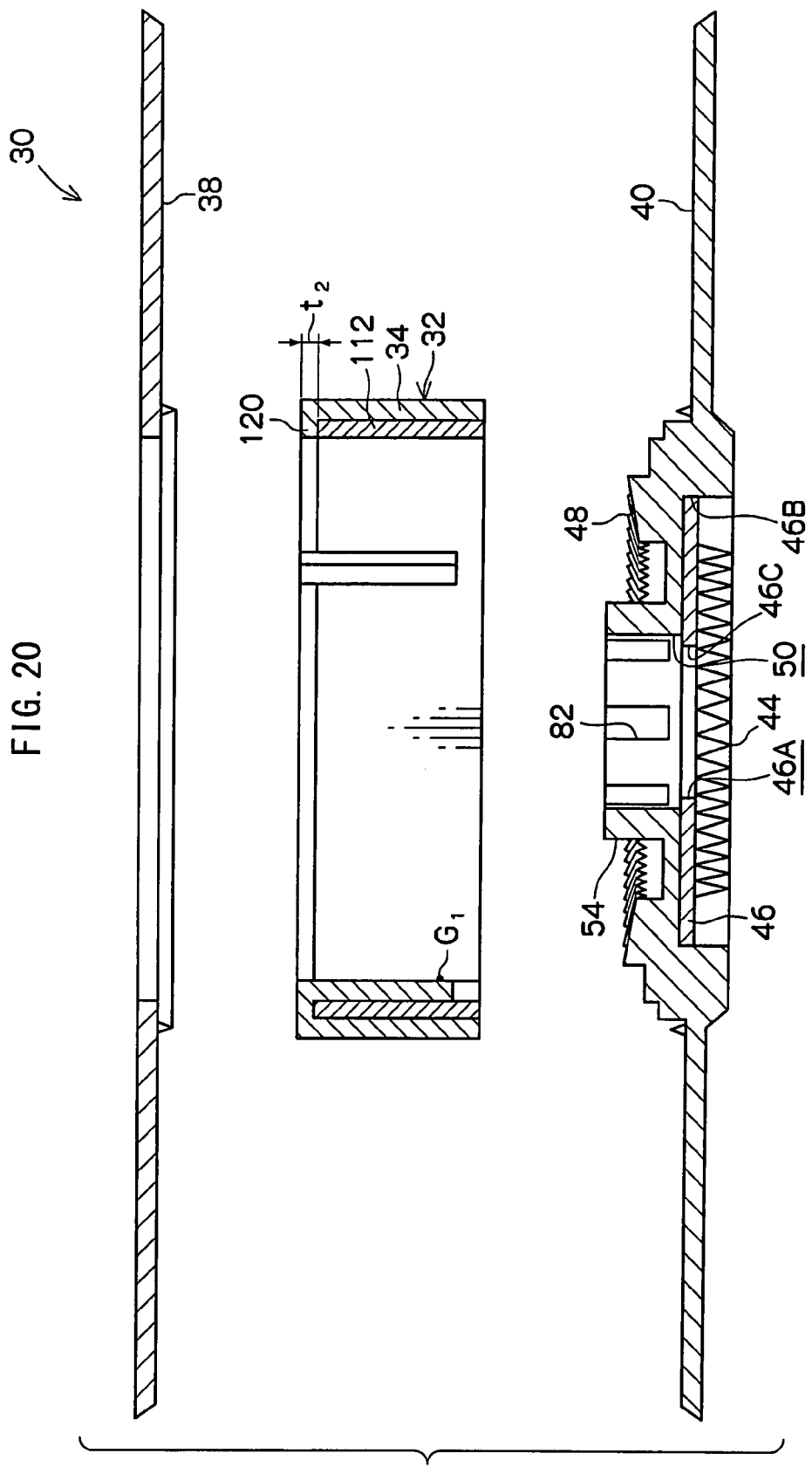

180
REEL

CROSS-REFERENCE TO RELATED APPLICATION

This application claims priority under 35 USC 119 from Japanese Patent Application No. 2006-278866, the disclosure of which is incorporated by reference herein.

BACKGROUND OF THE INVENTION

1. Field of the Invention

The present invention relates to a reel for winding recording tape thereon, such as magnetic tape or the like mainly used as a recording/reproducing medium for a computer or the like.

2. Description of the Related Art

There has been known a recording tape cartridge whose reel winding thereon a magnetic tape is received in a case, as an external recording medium for a computer or the like. The reel has a hub forming an axial portion thereof and winding a magnetic tape around the outer periphery thereof, and top and bottom flanges respectively disposed at the ends of the hub in an axial direction and extending outwards in a radial direction.

Traditionally, a recording tape cartridge is known that a recording tape, such as a magnetic tape used as a data recording/reproducing medium for a computer or the like, is wound over a single reel so that the reel can be rotatably received in a synthetic resin case. The recording tape has a distal end (free end) provided with a leader member, e.g. a leader pin, a leader tape or a leader block. The leader member is to be pulled out through an opening of the recording tape cartridge by a pulling-out portion provided on a drive device side so that the recording tape, secured to the leader member, can be wound onto the take-up reel provided on the drive device side.

In the reel of such a recording tape cartridge, the recording tape is usually wound around the outer peripheral surface of the hub. The hub is provided with top and bottom flanges at the top and bottom thereof. Due to the top and bottom flanges, the vertical position of the recording tape can be controlled, and a favorable winding shape can be maintained, thus improving the running stability of the tape. Furthermore, excessive damage can also be prevented when the cartridge is not in use.

The hub is frequently formed in a cylindrical shape having a base that is open at one side in an axial direction and closed at the other side. Due to the winding pressure of the magnetic tape, the open end side of low strength of a hub formed in such a cylindrical shape with a base tends to deform. When the hub is deformed in this manner, the flange provided on the open end side of the hub deforms in a contact direction towards an end portion (edge) in a width direction of the magnetic tape.

Consequently, to prevent the hub from deforming, a structure wherein the hub is reinforced with a metal ring at its inner periphery has been proposed, as disclosed in the Japanese Patent Application Laid-Open (JP-A) Nos. 2004-14022 and 2005-116163. If, by insert molding, the hub and the bottom flange are integrated, and a metal ring is provided at the inner periphery side of the hub, the need to connect a resin portion of the outer periphery side of the hub to the bottom flange results in a single resin layer disposed at an end portion of the metal ring in an axial direction of the hub.

Because the metal ring is not present in the single resin layer, a low rigid region occurs in a part of the hub. In case a low rigid region is caused in a part of the hub in this manner, the tape undergoes an uneven force from the hub upon tightly winding thereof, thus raising a concern of tape characteristic deterioration. Besides, on the hub side, stress concentration occurs at the boundary between the metal ring and the single resin layer, thus raising a concern of crack occurrence in the single resin layer at around the metal ring.

SUMMARY OF THE INVENTION

The present invention has been made in view of the above circumstances and provides a reel.

A first aspect of the present invention provides a reel comprising: a hub with a recording tape wound thereon and reinforced by a reinforcing ring; and a pair of flanges provided at both end portions of the hub that hold end portions in a width direction of the recording tape, wherein the hub has a resin layer at which the reinforcing ring is not present, and the length of the resin layer in an axial direction of the hub is 0.8-1.7 mm.

BRIEF DESCRIPTION OF THE DRAWINGS

Embodiments of the present invention will be described in detail based on the following figures, wherein:

FIG. 20 is a schematic exploded cross-sectional view showing a second modification of the reel structure according to the embodiment of the present invention.

DETAILED DESCRIPTION OF THE INVENTION

Figure 1A:
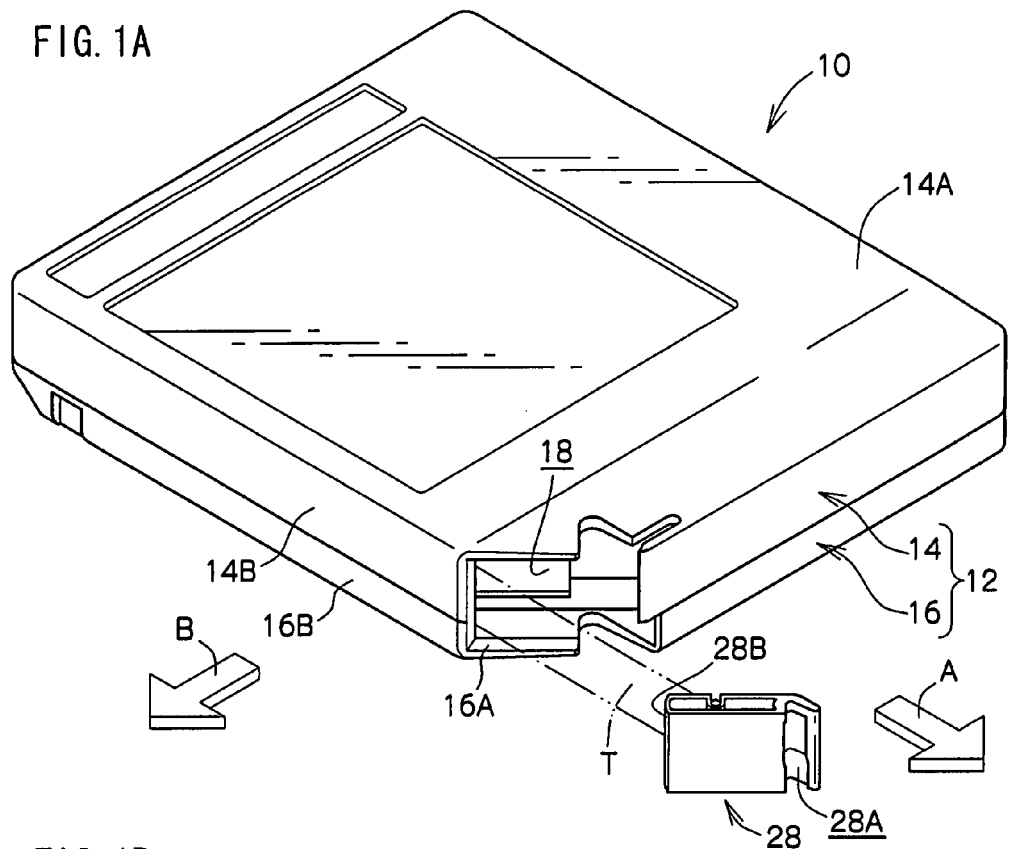
FIG. 1A is a schematic perspective view of a recording tape cartridge according to an embodiment of the present invention, as viewed from above.

Herebelow, an example of an exemplary embodiment of the present invention will be described in detail with reference to the drawings. First explanation will be given of the outline configuration of a recording tape cartridge 10. For ease of explanation, the direction of loading into a drive device of the recording tape cartridge 10 is shown by the arrow A, and this is designated as the front direction (front side) of the recording tape cartridge 10. Also, the direction orthogonal to the direction of arrow A, shown by the arrow B, is designated as the right direction (right side) of the recording tape cartridge 10.

The recording tape cartridge 10 has a case 12, as shown in FIGS. 1A to 3. The case 12 is configured by an upper case 14 and a lower case 16, these being joined together. Specifically, the upper case 14 is configured such that a substantially frame-shaped peripheral wall 14B projects along the outer edge of a top panel 14A that is substantially rectangular in plan view. The lower case 16 is configured such that a substantially frame-shaped peripheral wall 16B projects along the outer edge of a bottom panel 16A that has a shape substantially corresponding to that of the top panel 14A. The case 12 is formed in a substantial rectangular box shape, with the upper case 14 and the lower case 16 being joined together by ultrasonic welding or screws or the like, in a state in which the open end of the peripheral wall 14B and the open end of the peripheral wall 16B abut each other.

At a corner portion of the case 12 at the leading edge in the direction of loading into a drive device, the top panel 14A, the peripheral wall 14B, the bottom panel 16A and the peripheral wall 16B are respectively cut away, such that an opening 18 is formed, inclined with respect to the loading direction. Also a gear opening 20 is provided in the substantially central portion of the bottom panel 16A, the gear opening 20 being circular and pierced through the bottom panel 16A for exposing a reel gear 44, which will be described later. An annular rib 22 projects toward the inner side of the case 12 at an edge portion of the gear opening 20 on the bottom panel 16A, and is for positioning a reel 30, described later, and for preventing dust ingress.

Moreover, a pair of positioning holes 24, 26 are opened in a vicinity of the front end of the outer surface of the bottom panel 16A of the case 12. The pair of positioning holes 24, 26 are pouch shaped and provided within projections (not illustrated) which upstand from the bottom panel 16A toward the interior of the case 12, and are disposed separated from one another along the imaginary line in the direction B. The positioning hole 24, which is the positioning hole closer to the opening 18, is formed in a substantially square shape, as viewed from the bottom, and circumscribes a positioning pin (not illustrated) of a drive device. The positioning hole 26 is an elongated hole, whose longitudinal direction runs along the above imaginary line, and whose width corresponds to the diameter of a positioning pin. It is configured such that when the recording tape cartridge 10 is loaded into a drive device and positioning pins are inserted into the respective positioning holes 24, 26, the recording tape cartridge 10 is correctly positioned in the horizontal directions (the left/right direction and the front/back direction) within a drive device.

The portions of the bottom panel 16A around the positioning holes 24, 26 are reference surfaces 24A, 26A that are finished so as to be smoother than the other portions (designed surfaces) of the bottom panel 16A. When the positioning pins are inserted into the positioning holes 24, 26, the reference surfaces 24A, 26A abut reference surfaces (not illustrated) of a drive device which are provided around the positioning pins. In this way, the vertical direction positioning of the recording tape cartridge 10 within the drive device is carried out.

Figure 1B:
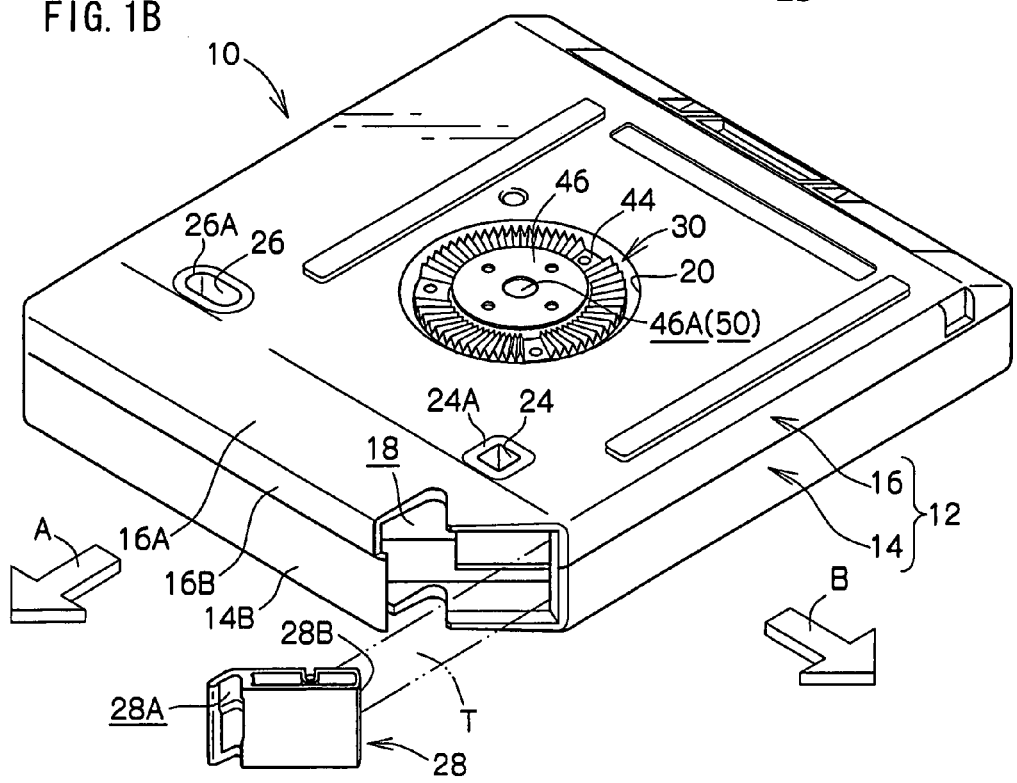
FIG. 1B is a schematic perspective view of the recording tape cartridge according to the embodiment of the present invention, as viewed from below.
Figure 2:
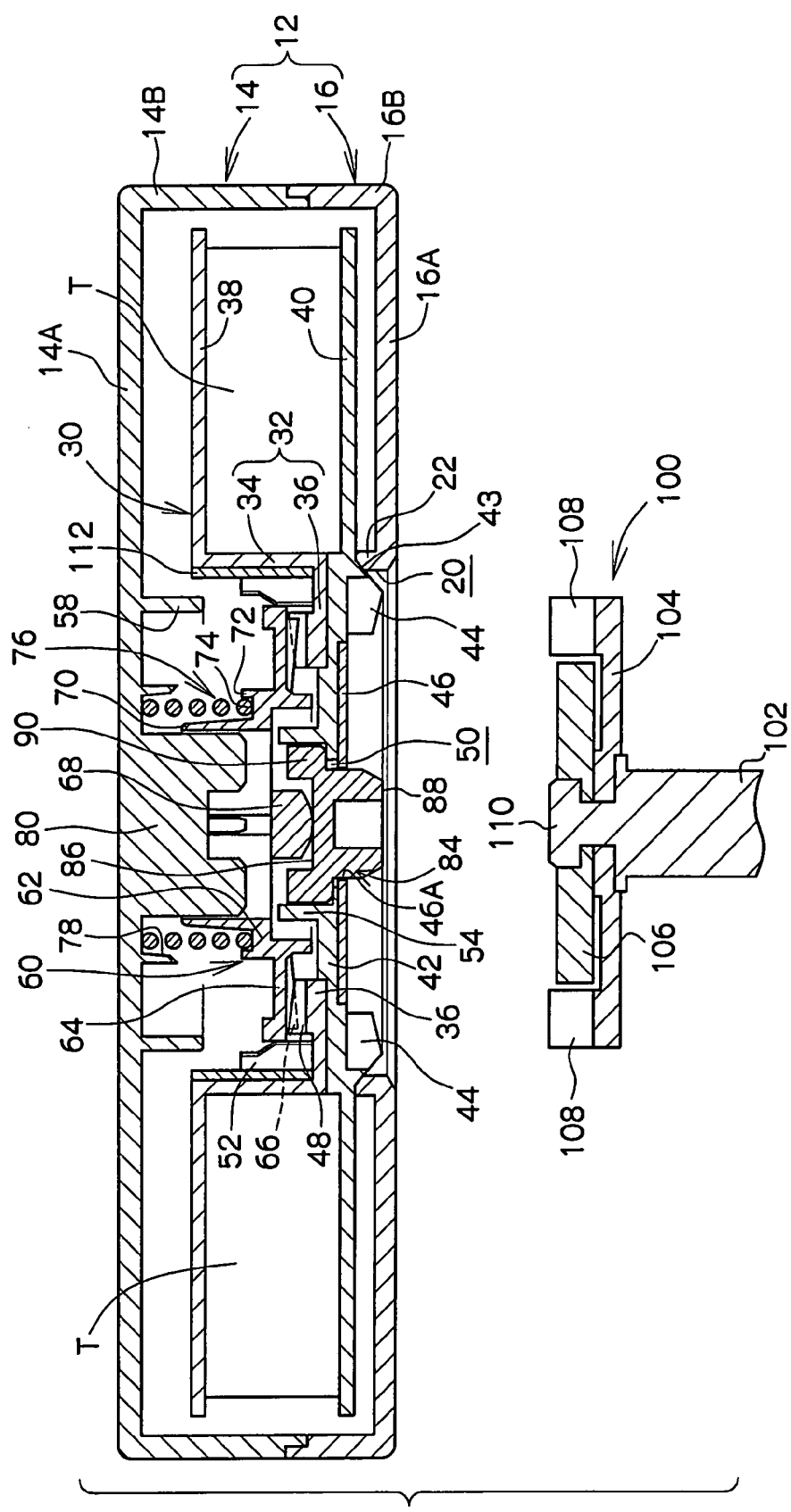
FIG. 2 is a schematic cross-sectional view of the recording tape cartridge according to the embodiment of the present invention, in the case the reel is in a rotation locked position.
Figure 3:
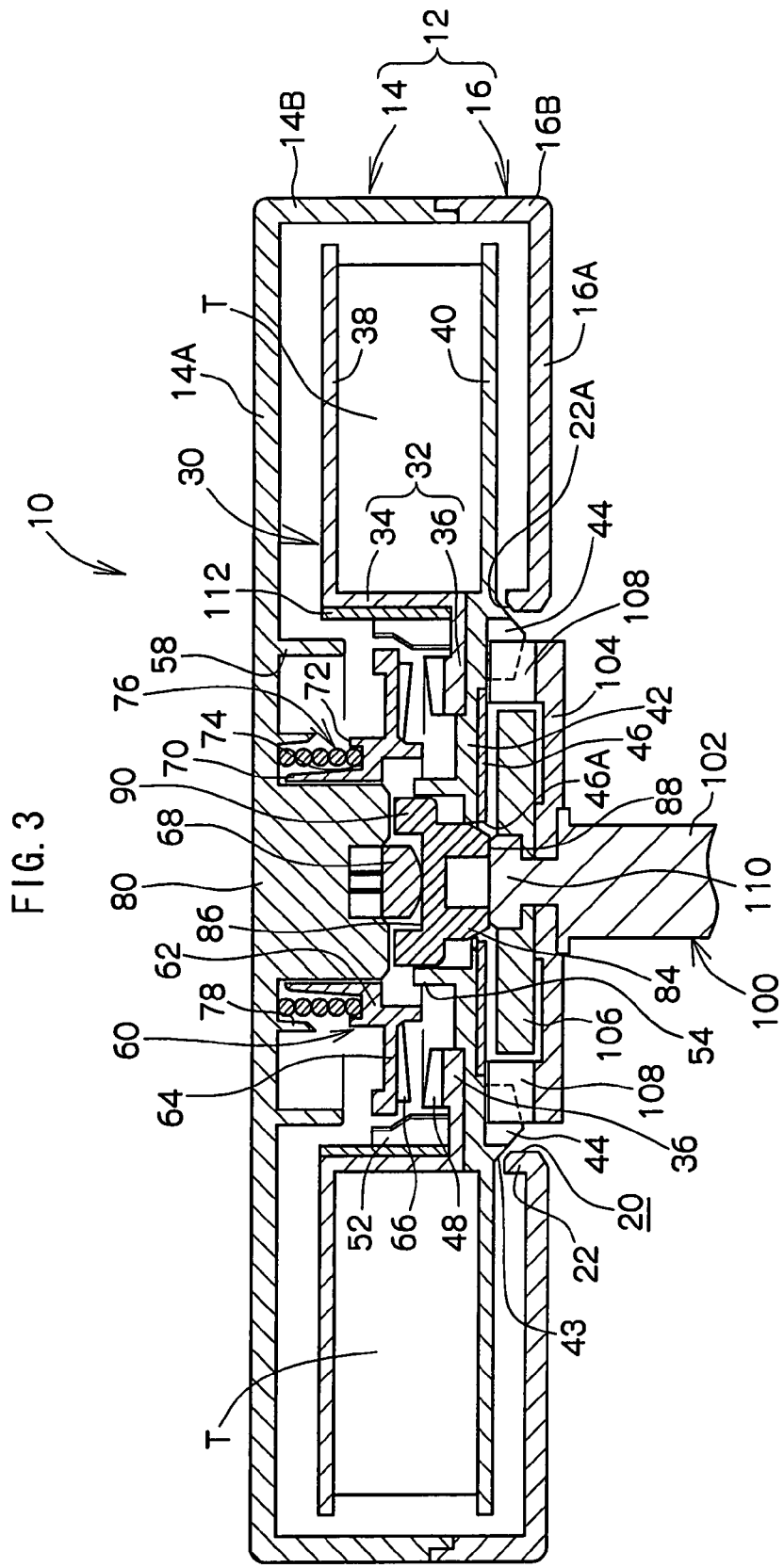
FIG. 3 is a schematic cross-sectional view of the recording tape cartridge according to the embodiment of the present invention, in the case the reel is in a rotation permitted position.
Figure 4:
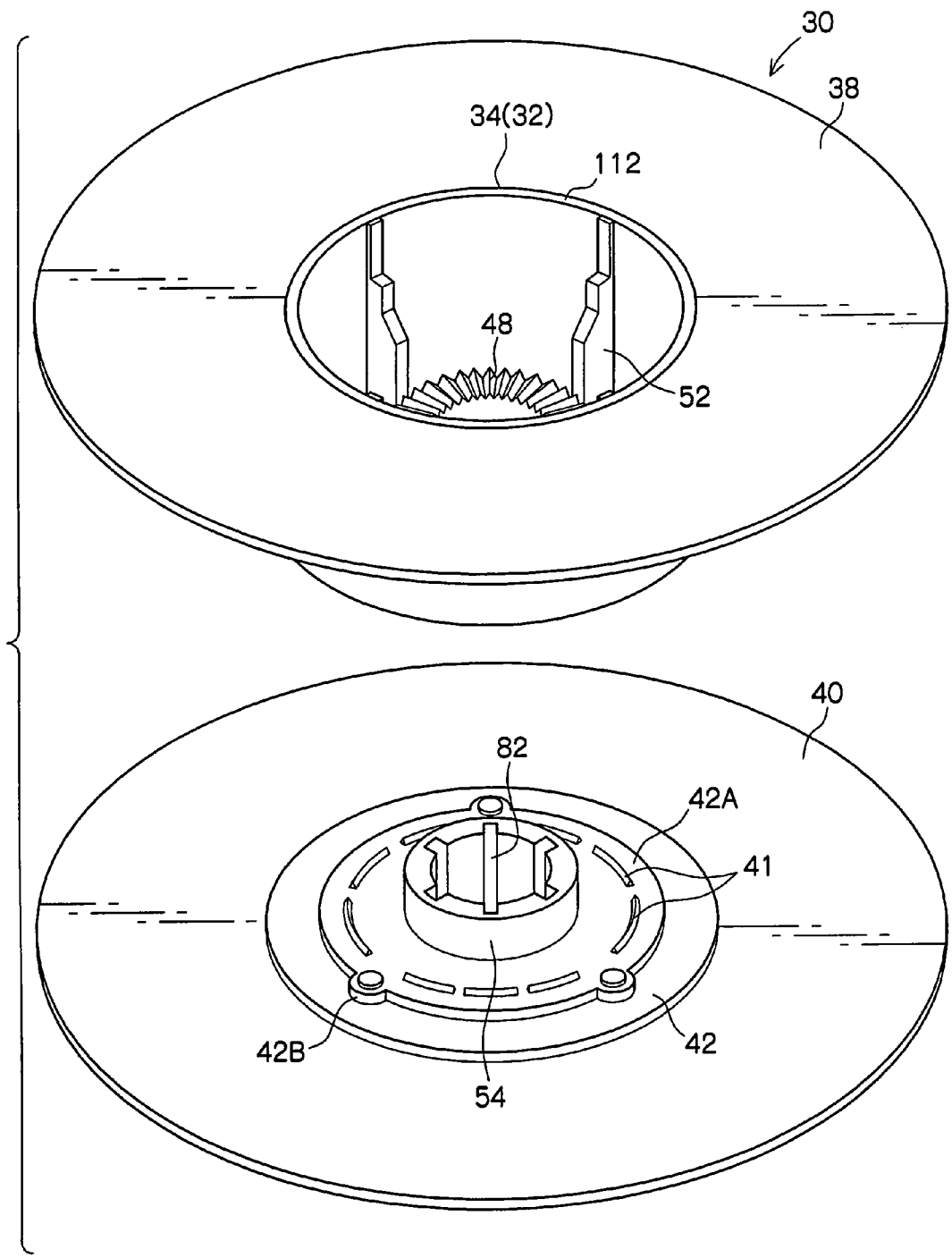
FIG. 4 is a schematic exploded perspective view of the reel according to the embodiment of the present invention, as viewed from above.
Figure 5:
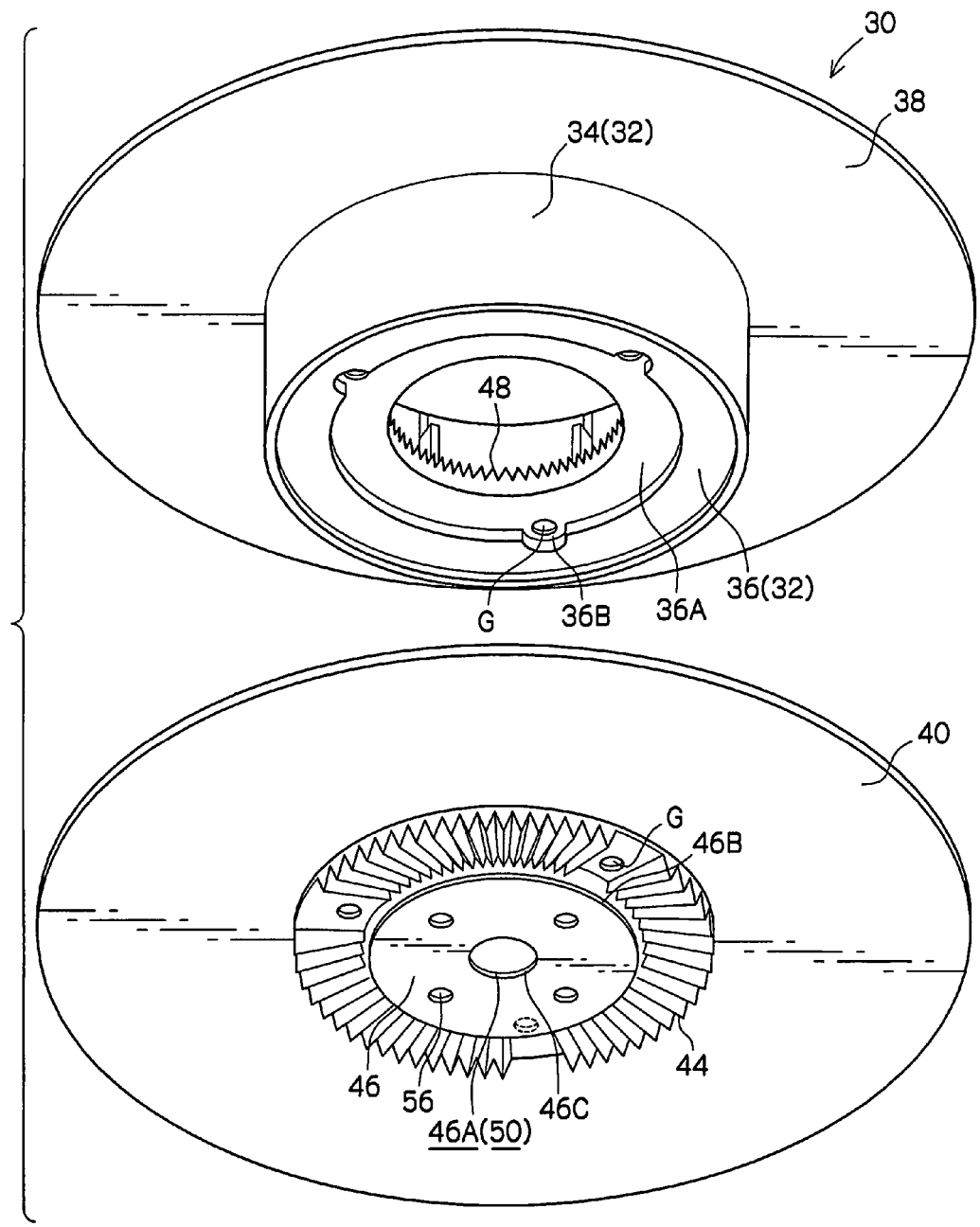
FIG. 5 is a schematic exploded perspective view of the reel according to the embodiment of the present invention, as viewed from below.

As shown in FIGS. 2 and 3, a single reel 30, which will be described later, is rotatably accommodated within the case 12. A recording tape T, of magnetic tape or the like, is wound on the reel 30, and, as shown in FIGS. 1A and 1B, a leader block 28, which serves as a leader member, is attached to the distal end of the magnetic tape T. The leader block 28 is, when the recording tape cartridge 10 is not being used, accommodated and held at the inside of the opening 18 of the case 12. In this state, the leader block 28 closes the opening 18, and prevents entry of dust and the like into the case 12.

An engaging recess portion 28A is formed in the distal end of the leader block 28. In the drive device, when the magnetic tape T is pulled-out, a pull-out portion (not illustrated), engages with the engaging recess portion 28A, and by doing so the tape T is pulled out of the case 12 and guided to a take-up reel (not illustrated) of the drive device. Moreover, the end surface of the leader block 28, at the side opposite to the side of the engaging recess portion 28A, is an arc-shaped surface 28B, and by fitting the arc-shaped surface 28B into the reel hub of the take-up reel, the arc-shaped surface 28B forms a portion of the take-up surface around which the recording tape T is taken-up.

Now explanation is made on the reel 30 and the movement restricting portion for stopping the reel 30 from rotating when not used. As shown in FIGS. 4 to 7, 10 and 11, the reel 30 has a reel hub 32 structuring an axial portion thereof. The reel hub 32 has a cylindrical portion 34 formed of polycarbonate and having a wall thickness of 1.0 mm on which outer peripheral surface the recording tape T is wound, an aluminum ring (reinforcing ring) 112 insert-molded at an inner peripheral surface of the cylindrical portion 34 and having a wall thickness of 1.0 mm, and an annular extension portion 36 provided at an bottom end portion of the cylindrical portion 34 and extending integrally annularly toward the center of the cylindrical portion 34 with a predetermined width. Incidentally, the annular extension portion 36 has a width W (see FIG. 7) in a degree to form an engagement gear 48 and standing ribs 52, described later.

An annular recess portion 36A, serving as an engagement receiving portion, is formed with a given depth at the bottom surface of the annular extension portion 36, at the side of the reel hub 32 center. Plural (three in the figure) widened recess portions 36B are formed at specific intervals in the annular recess portion 36A, widening out the recess portion 36A in a radial direction in circular arc shapes. Gates G, which are the pouring holes of resin material for the mold (not illustrated)

for forming the reel hub 32 and a top flange 38, are formed in these widened recess portions 36B. Also, at the peripheral edge of a top end portion of the reel hub 32, a top flange 38 is disposed coaxially and integrally and extends outwards in the radial direction. That is, the reel hub 32 and the top flange 38 are integrally formed with resin material.

A bottom flange 40 with a metal reel plate 46, described later, fixed thereto is joined (welded) to a bottom end portion of the reel hub 32. As shown in FIGS. 4, 5 and 8 to 11, the bottom flange 40 has an external diameter that is the same as the external diameter of the top flange 38, and a bottom wall 42 is formed with substantially the same diameter as the reel hub 32 at an axial portion of the bottom flange 40.

An annular protrusion portion 42A is formed at a specific height on the top surface of the bottom wall 42, the annular protrusion portion 42A serving as an engaging portion to engage with the annular recess portion 36A. Plural (three in the figure) widened protrusion portions 42B are formed at specific intervals on the annular protrusion portion 42A, to fit into the widened recess portions 36B.

Also, as shown in FIGS. 8 to 11, as ribs for use when welding, plural (nine in the figure) energy directors 41 (referred to as "ED" below) protrude at even intervals from the top surface of the annular protrusion portion 42A, in the region where the reel plate 46 is present (between the outer peripheral edge portion 46B and the inner peripheral edge portion 46C).

Therefore, when welding the bottom flange 40 to the bottom surface of the annular extension portion 36 of the reel hub 32, the widened recess portions 36B and the widened protrusion portions 42B are fitted together, and the annular recess portion 36A and the annular protrusion portion 42A are fitted together, and the ED 41 is welded by ultrasonic waves generated by a horn (not illustrated).

Due to this, the bottom flange 40 (and the later described reel gear 44) may be positioned relative to the reel hub 32, while welding the annular recess portion 36A and the annular protrusion portion 42A, and the recording tape T is able to be wound on the outer peripheral surface of the cylindrical portion 34 of the reel hub 32 between the surfaces of the top flange 38 and the bottom flange 40.

In this manner, ED 41 is provided on the top surface of the annular protrusion portion 42A in the region where the reel plate 46 is present, and the metal reel plate 46 is provided just below the joint portion (welded portion) of the reel hub 32 (the annular recess portion 36A) and the bottom flange 40 (the annular protrusion portion 42A), so that the reel plate 46 can prevent deformation due to the recording tape T being wound tightly.

Figure 9:
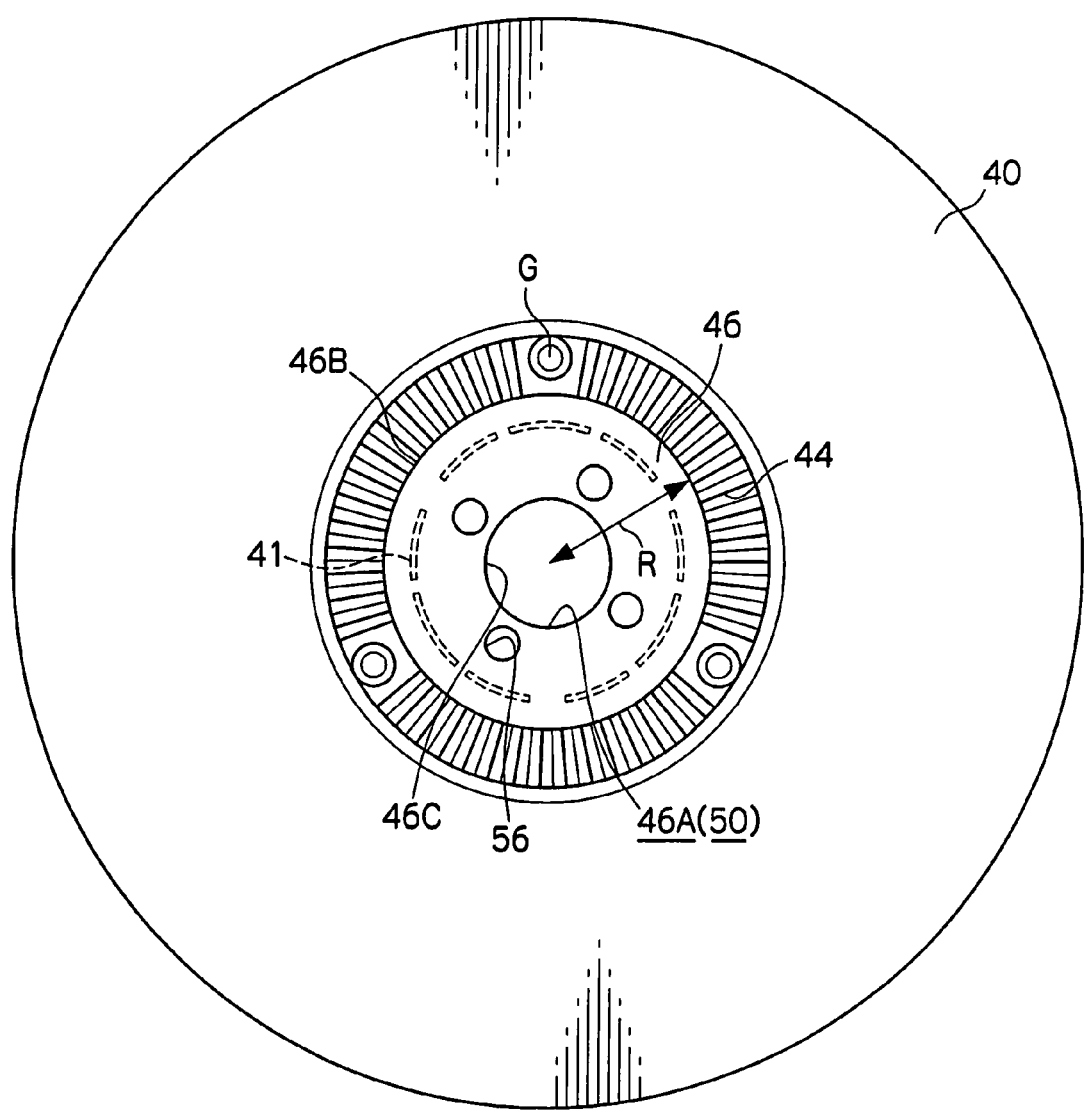
FIG. 9 is a schematic bottom view of the bottom flange of the reel according to the embodiment of the present invention.

Further, as shown in FIG. 9, the reel gear 44 is formed on the bottom surface (outer surface) of the bottom wall 42 on the bottom flange 40, so as to be a ring-shape coaxial to the reel hub 32 when the reel hub 32 is joined. The reel gear 44 is meshable with a drive gear 108 provided at the distal end of a rotation shaft 100 of a drive device shown in FIGS. 2 and 3.

The tips of the teeth of the reel gear 44 project lower than the bottom surface of the bottom flange 40 and the bases of the teeth are disposed higher than the bottom surface of the bottom flange 40. The outer edge portions of each tooth in a radial direction, from a central portion of the teeth in a tooth height direction to the base of the teeth, are connected to the bottom flange 40 via a taper portion 43 that continues to the bottom flange 40. Meanwhile, plural (three in the figure) gates G, which are the pouring holes of resin material for the mold (not illustrated) for forming the bottom flange 40, are formed in a predetermined position in the reel gear 44.

Furthermore, a reel plate 46 that is an annular metal plate made from magnetic material is fixed, by insert molding, integrally and coaxially to the bottom wall 42 of the bottom flange 40 at the inside of the reel gear 44. Therefore, the reel plate 46 is provided with plural (four in the figure) small holes 56 with step portions for resin material to flow into and be fixed.

Figure 10:
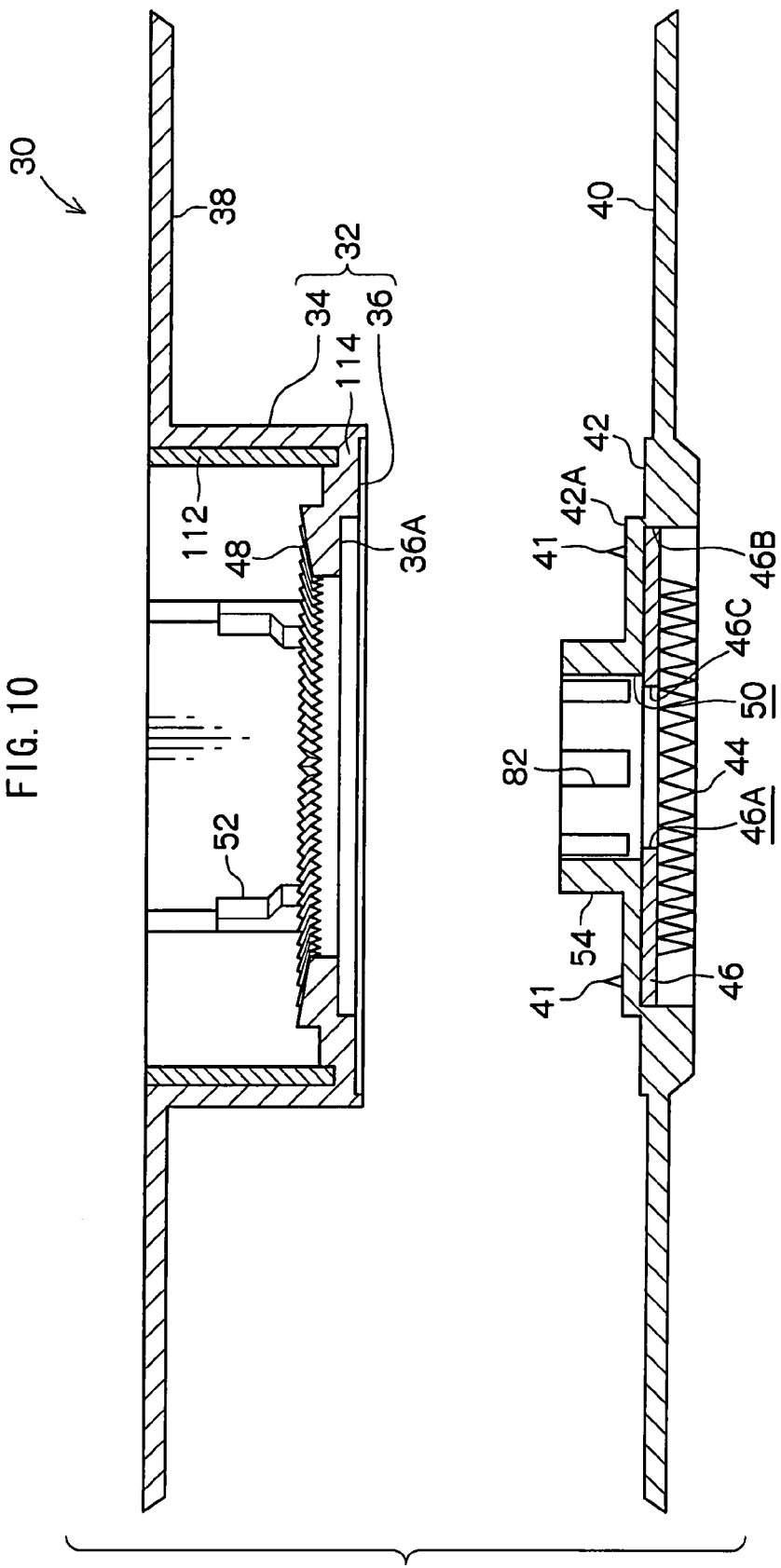
FIG. 10 is a schematic exploded cross-sectional view of the reel according to the embodiment of the present invention.
Figure 11:
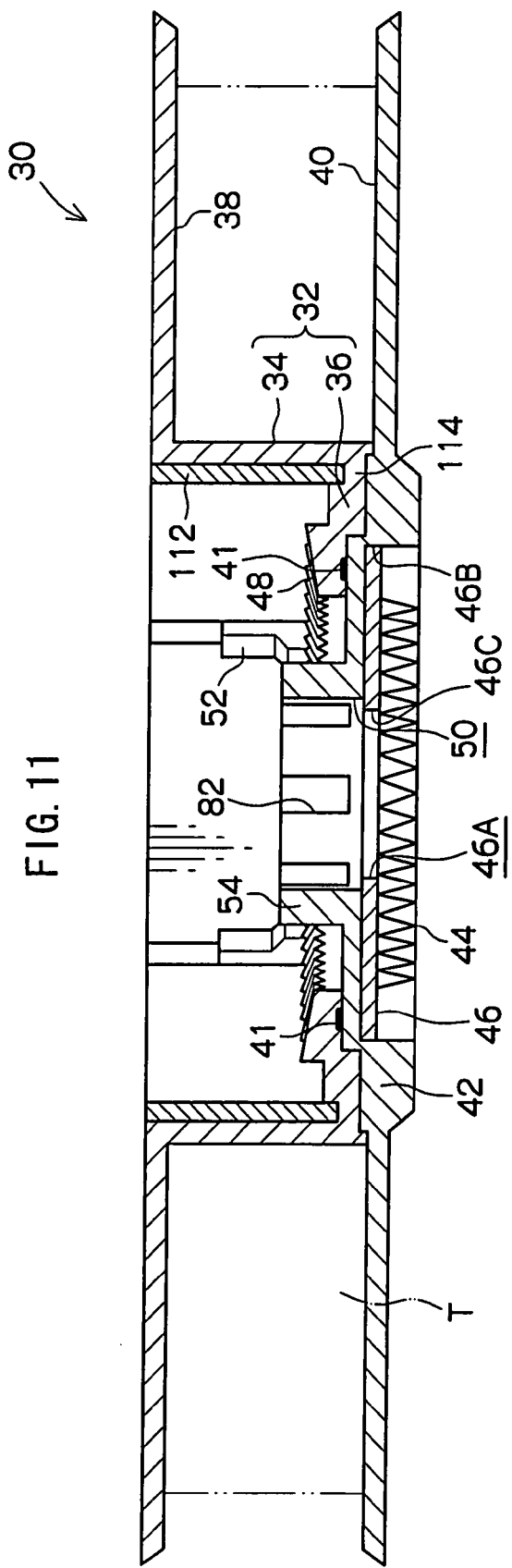
FIG. 11 is a schematic cross-sectional view of the reel according to the embodiment of the present invention.

Furthermore, a through hole 50 is formed at the center (axial portion) of the bottom wall 42 in the bottom flange 40, through which a later described clutch member 84 is inserted, and a short cylinder shaped clutch boss portion 54, serving as guide wall portion, is provided extending upwards around the edge portion of the through hole 50. Explanation will be given of the clutch boss portion 54 at the same time as explanation of the later described clutch member 84. At the axial portion of the reel plate 46 is a through hole 46A, and, as shown in FIGS. 10 and 11, the internal diameter of the through hole 46A is formed slightly smaller than the internal diameter of the through hole 50.

Figure 6:
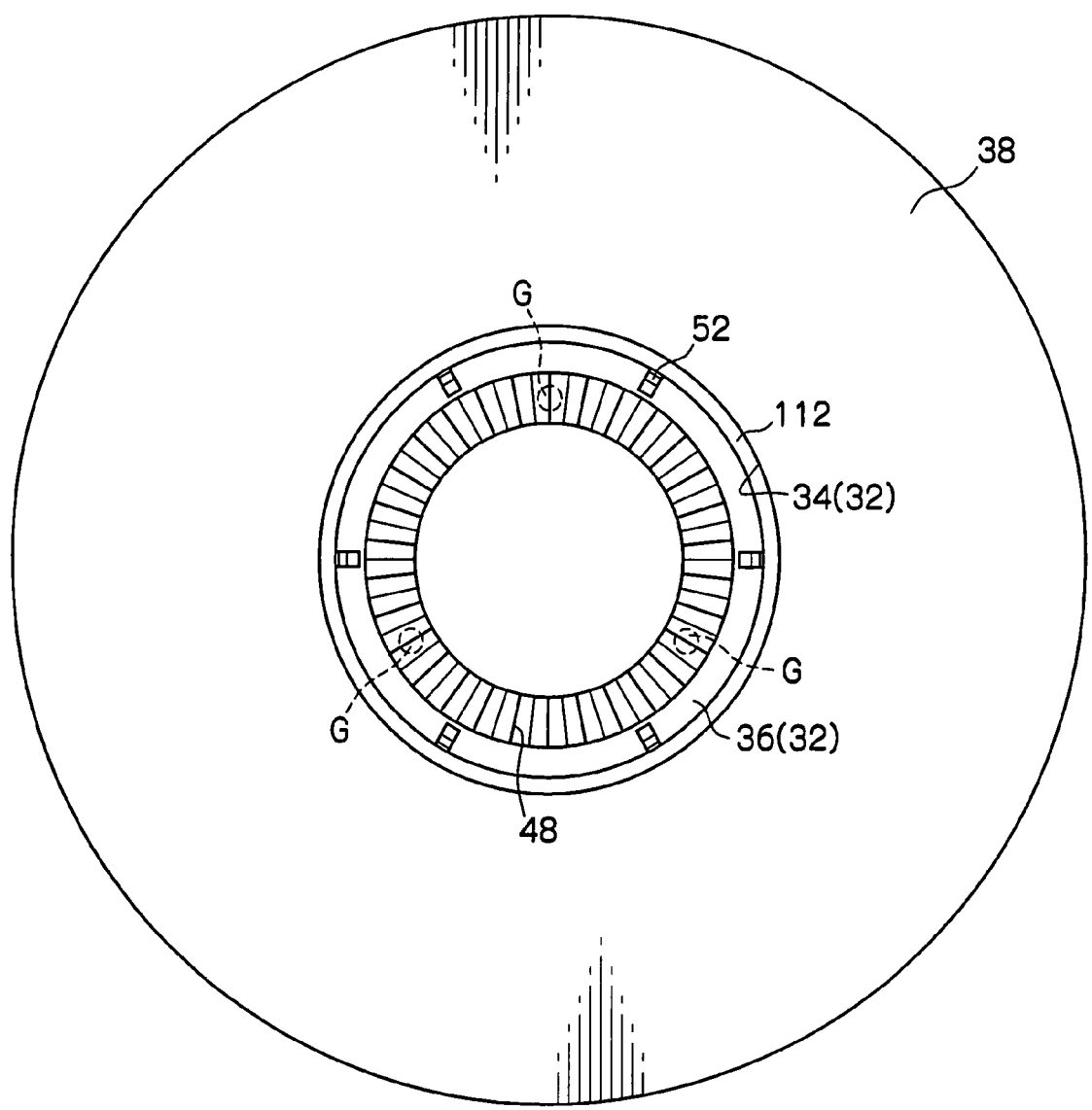
FIG. 6 is a schematic plan view of a top flange and a reel hub of the reel according to the embodiment of the present invention.
Figure 7:
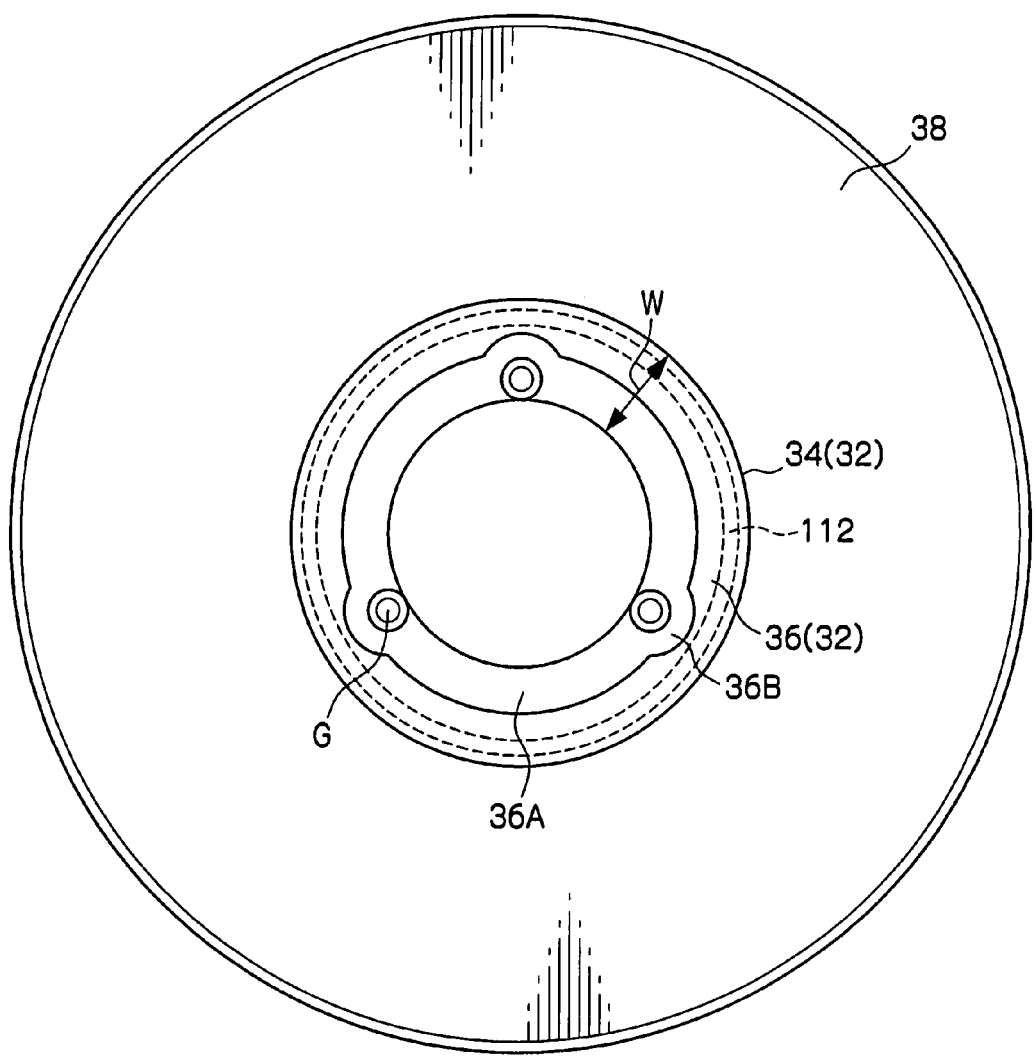
FIG. 7 is a schematic bottom view of the top flange and the reel hub of the reel according to the embodiment of the present invention.
Figure 8:
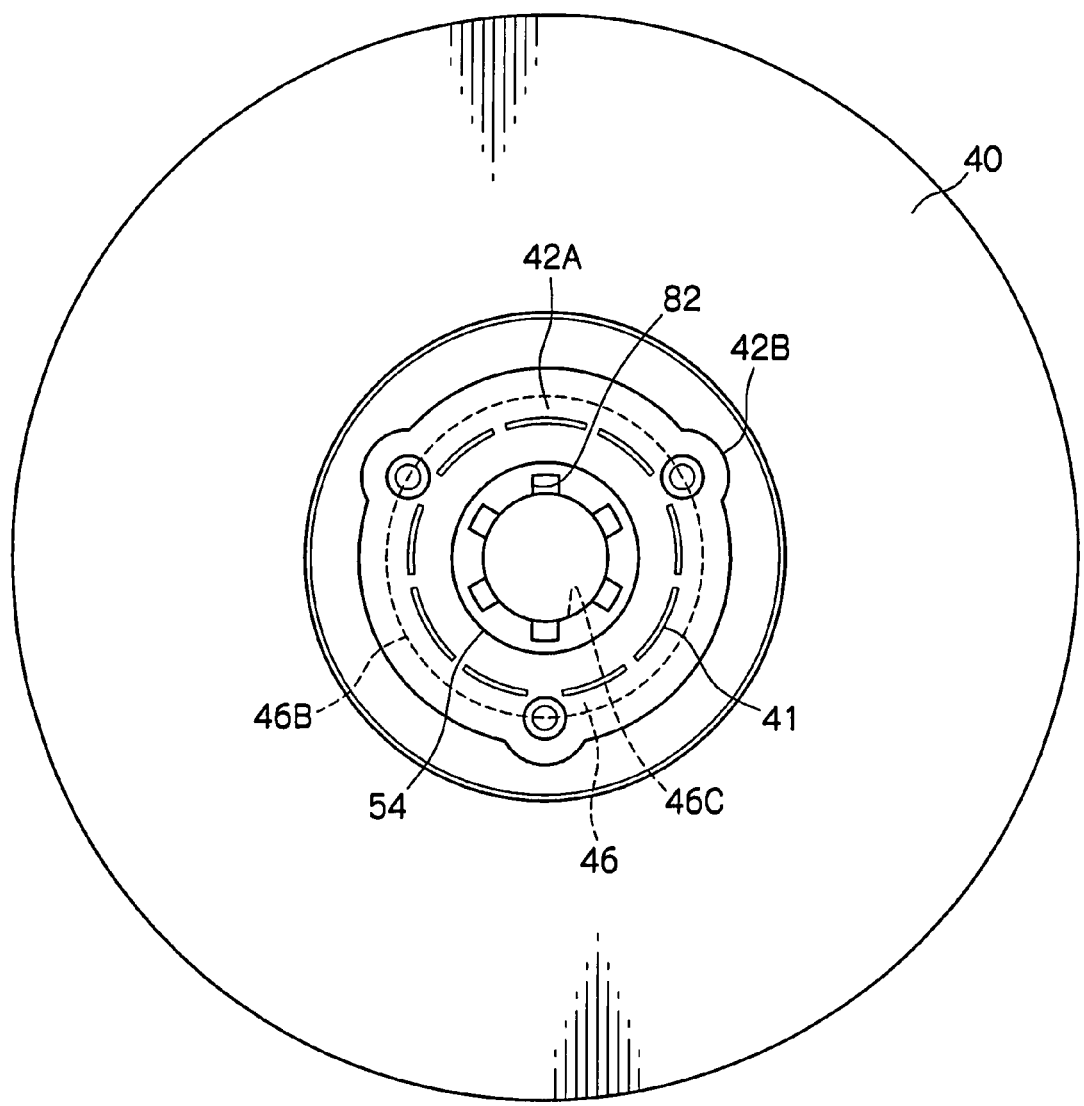
FIG. 8 is a schematic plan view of a bottom flange of the reel according to the embodiment of the present invention.

Also, as shown in FIG. 6, the engagement gear 48 is formed as a ring shape, coaxial to the reel hub 32 on the top surface of the annular extension portion 36 formed on the reel hub 32.

The engagement gear 48 is meshable with a later described movement restricting gear 66 of a brake member 60. Also, at the outside in the radial direction of the engagement gear 48, plural (six in the figure) standing ribs 52 are provided at even intervals in the circumferential direction, continuous to the internal surface of the aluminum ring 112 and the top surface of the annular extension portion 36, along the axial direction of the reel 30 respectively. The engagement gear 48 is positioned to the inside of the reel gear 44 in the radial direction by the presence of these standing ribs 52. Explanation regarding the standing ribs 52 will be given at the same time as that of the brake member 60.

As shown in FIGS. 2 and 3, the reel 30 is accommodated in the case 12, and is placed on the annular rib 22 when not in use. Specifically, the reel 30 is such that the outside portion of the taper portion 43 at the bottom wall 42 abuts the top end surface of the annular rib 22. The top end inner edges portion of the annular rib 22 has a taper surface 22A corresponding to the taper portion 43, and restricts movement of the reel 30 in the radial direction. It is a configuration such that dust and the like are prevented from penetrating from this portion.

In this state, the reel 30 is positioned overall within the case 12, with the reel gear 44 and the reel plate 46 exposed through the gear opening 20 (see FIG. 1B). That is, the reel gear 44 may be exposed from the outside of the case 12 though the gear opening 20, even though the reel gear 44 does not protrude past the outer surface (bottom surface) of the bottom panel 16A. The through hole 50 may also be exposed at the gear opening 20 through the through hole 46A of the reel plate 46.

By the above configuration, the operation, that is chucking (holding) and rotation driving, of the reel 30 is possible from outside of the case 12. Also, in this state, a ring shaped restriction rib 58 that extends from the top panel 14A intrudes into the upper portion of the aluminum ring 112 of the reel 30. The restriction rib 58 is configured so that the outer peripheral surface thereof approaches and is adjacent to the inner peripheral surface of the aluminum ring 112 (the reel hub 32), preventing rattling about of the reel 30 inside the case 12.

Furthermore, the recording tape cartridge 10 is provided with the brake member 60, serving as movement restricting portion for the reel 30 when the reel 30 is not in use. The brake member 60 has a base portion 62, and the base portion 62 is formed in substantially the shape of a bottomed cylinder that is open toward the bottom. A flat plate portion 64 is formed in a ring shape at an intermediate portion in the axial direction on an outer peripheral portion of the base portion 62, extending outwards in the radial direction around the whole of the circumference of the base portion 62, and a movement restricting gear 66 is formed around the whole of the circumference at the bottom surface of the flat plate portion 64. That is, the movement restricting gear 66 is formed overall in a ring shape, configured so as to be meshable with the engagement gear 48 of the reel 30.

Further, there is a sliding contact protrusion 68 at the axial portion of the bottom surface of the base portion 62. The sliding contact protrusion 68 is formed with a substantially spherical surface on the distal end portion, and undergoes approximately point contact with the later described clutch member 84. A cross-shaped protrusion 70 is formed with a substantially cross-shape groove in plan view at an internal portion thereof, standing up out of the top surface of the base portion 62. Furthermore, there is also an annular rib 72 projecting up from the top surface of the base portion 62. The top surface of the base portion 62 between the annular rib 72 and the cross-shaped protrusion 70 is a spring seat surface 74 that contacts with one end portion of a later described compression coil spring 76.

Such a brake member 60 is inserted substantially coaxially within the aluminum ring 112 of the reel hub 32 so as to be movable in the vertical direction (the reel 30 axial direction). That is, the brake member 60 is such that it is able, by moving in the vertical direction, to obtain a position (rotation locked position) in which the movement restricting gear 66 is meshed with the engagement gear 48 of the reel hub 32, and to obtain a position in which this meshing is released (rotation permitted position).

Also, a cross-shaped rib 80 protrudes in a downward direction from the top panel 14A of the case 12, so as to fit into the groove of the cross-shaped protrusion 70 of the brake member 60. The cross-shaped rib 80 has a rotation prevention shape of two mutually intersecting thin plate elements that, by meshing with the groove walls of the cross-shaped protrusion 70, prevents the rotation of the brake member 60 relative to the case 12. Therefore, the brake member 60 may prevent rotation of the reel 30 in the state in which the movement restricting gear 66 is meshed with the engagement gear 48 of the reel hub 32.

The cross-shaped rib 80 is able to maintain a state of fitting into the grooves for the entire movement stroke of the brake member 60 in the vertical direction, and is configured to function to guide the movement of the brake member 60 in the vertical direction. Furthermore, the brake member 60 is configured such that when in the rotation locked position, the brake member 60 is restricted to move in the radial direction by the standing ribs 52 of the reel 30, and when in the rotation permitted position, the brake member 60 does not interfere with the standing ribs 52 rotating with the reel 30.

That is to say, the standing ribs 52 are located to approach and be adjacent to an outer peripheral edge of the flat plate portion 64 of the brake member 60 located in the rotation locked position, and upper portions of the standing ribs 52 are cut out, so as to have a certain value of clearance to the outer peripheral edge of the brake member 60 located in the rotation permitted position. By doing so, not only is the movement of the reel 30 directly restricted by the case 12, but in the vicinity of the center of gravity of the reel 30, movement in the radial direction relative to the case 12 is restricted via the brake member 60, and the reel 30 is able to be stably loaded into a drive device with a vertical slot (with the reel 30 axis in the horizontal direction).

Furthermore, the compression coil spring 76, serving as a biasing member in the broader sense, is placed between the spring seat surface 74 of the brake member 60 and the top panel 14A. The compression coil spring 76 has one end portion thereof abutting the spring seat surface 74 and the other end portion thereof abutting the top panel 14A. The other end portion is located on the inside of an annular wall 78 that protrudes from the top panel 14A at the outside of the cross-shaped rib 80, so that there is no displacement in the radial direction.

The brake member 60 is biased in the downward direction (the brake member 60 is caused to be in the rotation locked position) by the biasing force of the compression coil spring 76, and unintentional rotation of the reel 30 may be reliably prevented by the meshing of the movement restricting gear 66 with the engagement gear 48. Also, by such a biasing force, the reel 30 meshed at the engagement gear 48 with the brake member 60 is also biased in the downward direction, and abutted against the annular rib 22 so that there is no rattling around of the reel 30 within the case 12.

The clutch member 84 is provided in the recording tape cartridge 10 and serves as a releasing member operated from outside when releasing the locked state of the reel 30 due to the brake member 60. The clutch member 84, along with the meshing operation of the reel gear 44 with the drive gear 108 of the drive device, moves upwards pressed by a later described release protrusion 110 of the drive device, and is disposed between the bottom wall 42 of the reel 30 and the brake member 60.

That is, the clutch member 84 is formed substantially in the shape of column that is inserted into the through hole 46A and the through hole 50, and the external diameter of the clutch member 84 is slightly smaller than the internal diameter of the through hole 46A of the reel plate 46, in other words also slightly smaller than the internal diameter of the through hole 50 that matches the internal diameter of the clutch boss portion 54. The clutch member 84 has the flat top end surface of the axial portion as a sliding contact surface 86 that is in continuous contact with the sliding contact protrusion 68 of the brake member 60, and the flat bottom end surface that surrounds a thinning hole provided open to the downward as a pressing operation surface 88. Therefore, when the pressing operation surface 88 is pressed, the clutch member 84 moves upward against the biasing force of the compression coil spring 76 and causes the brake member 60 to move to the rotation permitted position.

Also, the clutch member 84 is provided with rotation restricting ribs 90 that extend outwards in a radial direction from the outer peripheral surface of the clutch member 84. Plural rotation restricting ribs 90 (six in the present embodiment) are provided at uniform intervals in the peripheral direction of the clutch member 84, and the respective rotation restricting ribs 90 are disposed in a radial arrangement as seen in plan view. The respective rotation restricting ribs 90 project further up than the sliding contact surface 86, so as to spread (respectively connect) between the top end surface around the sliding contact surface 86 of the clutch member 84, and the outer peripheral surface in the vicinity of the top end surface of the clutch member 84.

The rotation restricting ribs 90 fit respectively within rotation restricting grooves 82 recessed in the inter edge portion of the clutch boss portion 54 (see FIGS. 4, 8, 10, 11). That is, there are six of the rotation restricting grooves 82 provided at even intervals in the peripheral direction of the clutch boss portion 54, and the rotation restricting grooves 82 are open toward the top at the top end of the clutch boss portion 54. In this way, at the rotation restricting ribs 90, the clutch member 84 is able to move in the vertical direction, while being guided by the rotation restricting grooves 82 of the clutch boss portion 54.

Furthermore, even when the clutch member 84 moves upward to place the brake member 60 in the rotation permitted position, the rotation restricting ribs 90 maintain a state in which they are fitted within the rotation restricting grooves 82 of the clutch boss portion 54. By doing so, the clutch member 84 is configured so as to be not rotatable relative to the reel 30, that is, always rotate as one with the reel 30. Also, the clutch member 84 may be prevented from dropping out of the reel hub 32 by the rotation restricting ribs 90 together with the rotation restricting grooves 82, since each of the rotation restricting grooves 82 are closed at a bottom end portion of the clutch boss portion 54.

As shown in FIGS. 2 and 3, the rotation shaft 100 of a drive device is provided with a rotation axis 102, and at the top end of the rotation axis 102 there is a circular plate shaped rotation table 104 extending integrally therefrom. The drive gear 108 is formed in a ring shape at the top surface of the rotation table 104 at an outer peripheral edge portion thereof, the drive gear 108 being meshable with the reel gear 44 of the recording tape cartridge 10. Also, a substantially circular plate shaped magnet 106 is disposed coaxially at the inside in the radial direction of the drive gear 108 at the top surface of the rotation table 104. The release protrusion 110 is formed at an axial portion of the rotation table 104, for abutting the pressing operation surface 88 of the clutch member 84.

Next, the operation of a recording tape cartridge 10 provided with a reel 30 of the above configuration will be explained. In the recording tape cartridge 10, when not in use, the brake member 60 is located in the rotation locked position with the movement restricting gear 66 meshed with the engagement gear 48, due to the biasing force of the compression coil spring 76. Therefore, the reel 30 is prevented from rotating relative to the case 12. In this state, the reel gear 44 of the reel 30 is exposed through the gear opening 20, and also the clutch member 84 may be seen from the gear opening 20 through the through hole 50 and the through hole 46A.

On the other hand, when the recording tape T is being used, the recording tape cartridge 10 is mounted into a drive device bucket (not illustrated) along the direction of arrow A. Then, when the recording tape cartridge 10 has been mounted to a predetermined depth, the bucket is lowered, and the rotation shaft 100 of the drive device approaches (moves upwards) relatively towards the gear opening 20 of the case 12 and holds the reel 30. Specifically, the rotation shaft 100 attracts and holds the reel plate 46 in a non contact manner using the magnet 106, while the drive gear 108 of the rotation shaft 100 meshes with the reel gear 44.

Along with the meshing of the reel gear 44 with the drive gear 108, that is, the relative movement of the rotation shaft 100 to the vicinity in the axial direction of the case 12, the release protrusion 110 of the rotation shaft 100 abuts the pressing operation surface 88 of the clutch member 84 and the clutch member 84 is pushed up against the biasing force of the compression coil spring 76. By so doing, the brake member 60 that is abutting the clutch member 84 at the sliding contact protrusion 68 is also moved upward, and the meshing of the movement restricting gear 66 of the brake member 60 with the engagement gear 48 is released.

That is, the brake member 60 is moved to the rotation permitted position relative to the reel 30. After this, when the rotation shaft 100 is further relatively moved upward, the reel 30 is lifted upwards, against the biasing force of the compression coil spring 76, with the clutch member 84 and the brake member 60 (without any relative displacement therebetween), and the brake member 60 reaches the rotation permitted position (relative to the case 12), and also the bottom flange 40 is separated from the annular rib 22 (the taper surface 22A). By doing so, the reel 30 is raised in the case 12, and is able to rotate in a state in which it does not contact the internal surfaces of the case 12.

At this time, by lowering the bucket, i.e. by lowering the recording tape cartridge 10 in the drive device, the respective positioning pins of the drive device are inserted into each of the positioning holes 24, 26 of the case 12, and also the reference surfaces of the drive device abut each of the reference surfaces 24A, 26A of the case 12. The positioning of the recording tape cartridge 10 relative to the drive device in the horizontal and vertical directions is thus made. Then, the pull-out portion of the drive device engages with the engaging recess portion 28A of the leader block 28, and pulls out the leader block 28 from the case 12, and guides the leader block 28 to the take-up reel of the drive device.

The leader block 28 is fitted into the reel hub of the take-up reel and the arc-shaped surface 28B of the leader block 28 configures a portion of the take-up surface for taking up the recording tape T. In this state, when the leader block 28 rotated as one with the take-up reel, the recording tape T is gradually wound up on the reel hub of the take-up reel, while being pulled out of the case 12 through the opening 18. At this time the reel 30 of the recording tape cartridge 10 is synchronously rotated with the take-up reel by the rotational force of the rotation shaft 100 transmitted by the drive gear 108 meshing with the reel gear 44.

Then, the information is recorded on the recording tape T, or information recorded on the recording tape T is reproduced, by a recording/reproducing head (not illustrated) disposed at a predetermined position along the path of the tape in the drive device. When doing so, the sliding contact protrusion 68 of the brake member 60 that is not rotatable relative to the case 12, is in sliding contact with the sliding contact surface 86 of the clutch member 84 that is rotating along with the reel 30 relative to the case 12. That is to say, in the state in which the reel gear 44 meshes with the drive gear 108, the clutch member 84 maintains an abutting relationship with the release protrusion 110 at the pressing operation surface 88, and maintains the movement restricting gear 66 in the rotation permitted position.

When the reel 30 is rotating, there is no relative rotation between the clutch member 84 rotating as one with the reel 30 and the rotation shaft 100 driving the reel 30, and it is configured such that there is no mutual sliding contact between the pressing operation surface 88 and the release protrusion 110, and there is mutual sliding contact between the sliding contact surface 86 of the clutch member 84 and the sliding contact protrusion 68 of the brake member 60, which is not able to rotate relative to the case 12. In this manner, since there is no relative rotation between the rotation axis 102 and the clutch member 84, there is no problem of abrasion between the release protrusion 110 and the pressing operation surface 88.

When the recording of the information on the recording tape T or the reproduction of information recorded on the recording tape T, has been concluded, the recording tape T is rewound onto the reel 30, and the leader block 28 is retained in the vicinity of the opening 18 of the case 12. Then, the bucket in which the recording tape cartridge 10 has been loaded is raised. By doing so, the meshing of the reel gear 44 with the drive gear 108 is released, the abutting of the release protrusion 110 with the pressing operation surface 88 of the clutch member 84 is released, and the clutch member 84 is moved downward, together with the brake member 60, by the biasing force of the compression coil spring 76 (while maintaining the abutting state).

In this way the movement restricting gear 66 of the brake member 60 meshes with the engagement gear 48, and the brake member 60 returns to the rotation locked position in which the rotation of the reel 30 relative to the case 12 is restricted. Furthermore, along with the movement of the brake member 60 and the clutch member 84 by the biasing force of the compression coil spring 76, the reel 30 also moves downward, and the bottom flange 40 of the reel 30 is caused to abut the annular rib 22, returning to the initial position in which the reel gear 44 is exposed via the gear opening 20. In this state, the recording tape cartridge 10 is ejected from the drive device (bucket).

The gist of the reel 30 in the embodiment of the present invention is explained next.

Figure 12:
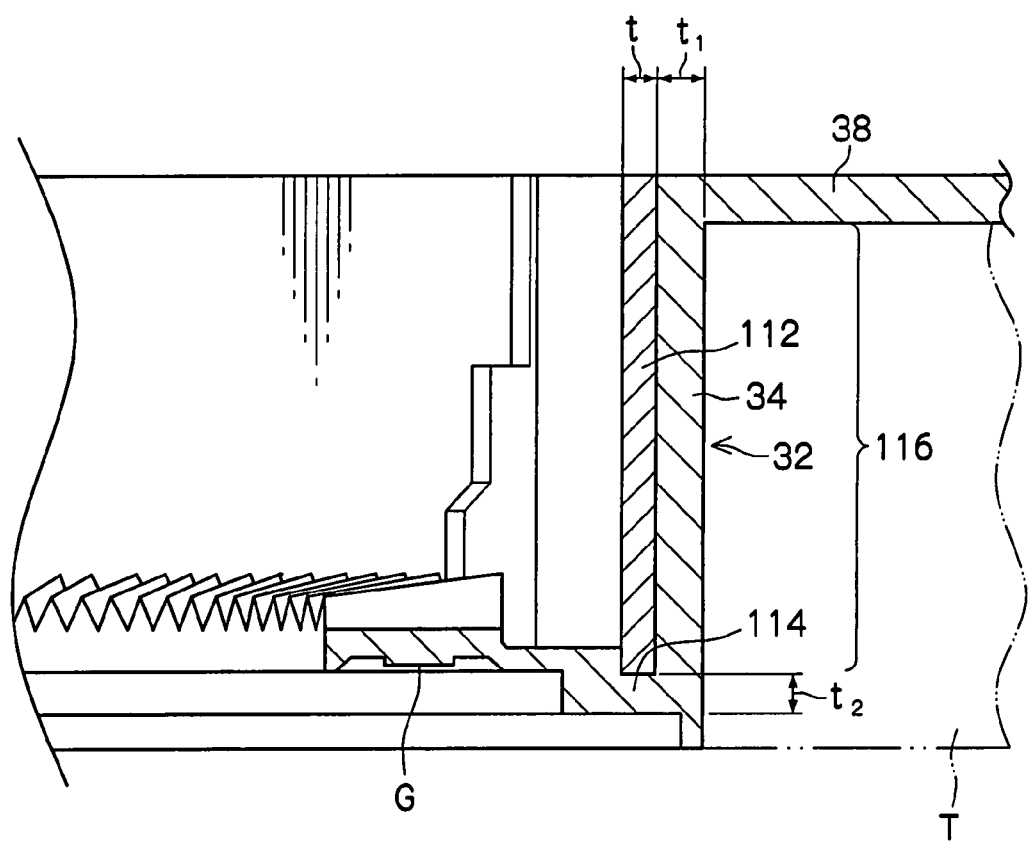
FIG. 12 is an enlarged cross-sectional view explaining the gist of the reel according to the embodiment of the present invention.

FIG. 12 shows a cross-sectional view of the reel hub 32. In the reel hub 32, the aluminum ring 112 has a wall thickness t of 1.0 mm while the cylindrical portion 34 has a wall thickness $t_1$ of 1.0 mm. In the annular extension portion 36, the resin layer 114 lying below the aluminum ring 112 (referred to as a "single resin layer" below) has a length in an axial direction of the reel hub 32 (wall thickness $t_2$) of 0.8-1.7 mm.

The gate G for the mold for the reel hub 32 and the top flange 38 is provided at the inside of the reel hub 32. There is a need to secure a passage for resin to flow from the gate G to the cylindrical portion 34 provided at the outside of the aluminum ring 112. This requires the provision of a single resin layer 114 below the aluminum ring 112 in an axial direction of the reel hub 32.

Here, the reel hub 32 uses a resin material PC having a fluidity not well as compared to that of ABS or the like. For injection molding, the single resin layer 114 preferably has a greater wall thickness (length in an axial direction of the reel hub 32), i.e. requiring a wall thickness of at least approximately 0.8 mm.

Figure 13:
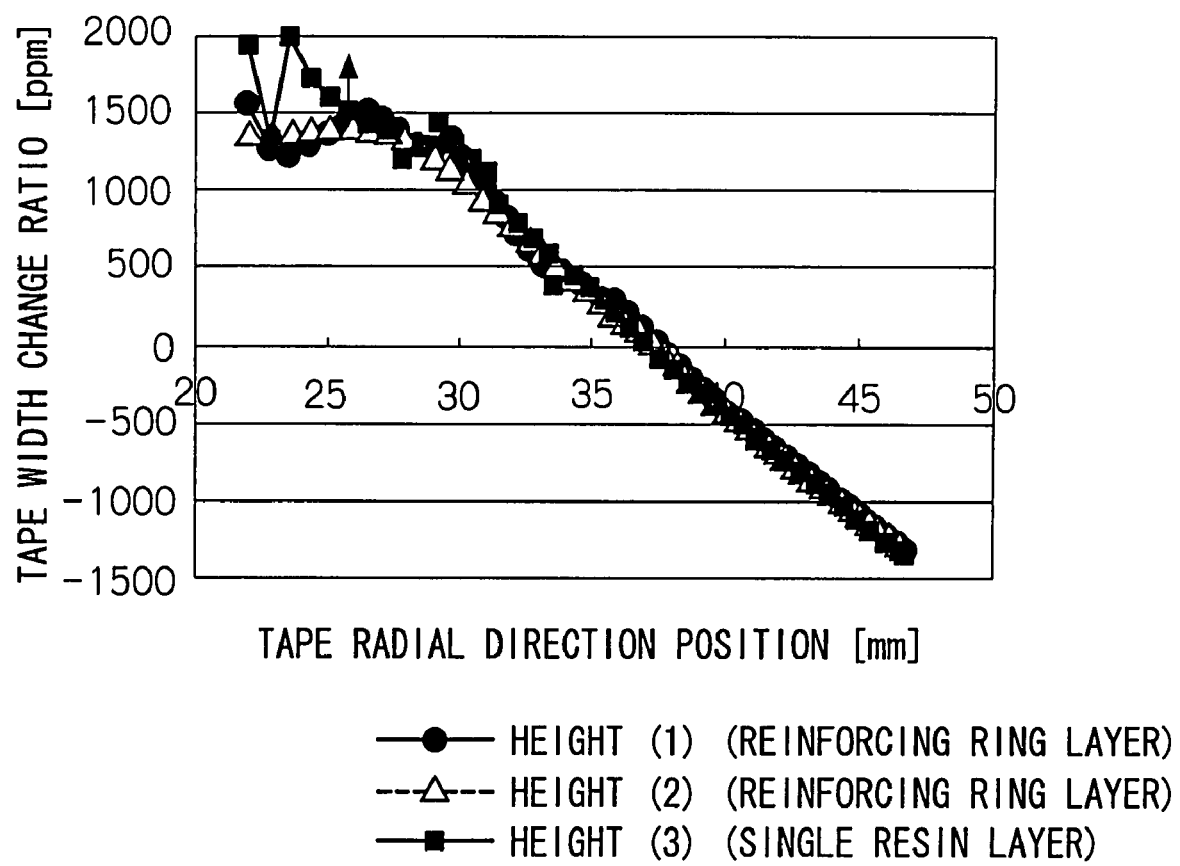
FIG. 13 is a graph showing a tape width change ratio of a recording tape wound on the reel according to the embodiment of the present invention.

Meanwhile, FIG. 13 shows calculated values indicating tape width change when the recording tape is wound on the reel hub 32 and stored under severe conditions of high temperature and humidity. If the change in tape width is significant during storage in the recording tape cartridge 10, different tracks may be accessed upon tape writing and reading, resulting in erroneous recording or reading.

For this reason, tape width change is required restricted within a certain range. In a graph of FIG. 13, shown is a calculation result of tape width change in an environment under a condition at high temperature and humidity of 60° C. 90% RH over two weeks or the equivalent, according to a finite element method calculation software.

The axis of abscissa represents a radial direction position with respect to the reel hub 32, wherein the start position of tape winding is given as r=22 where the tape is in contact with the reel hub 32. The axis of ordinate represents a tape width change relative to the state before stored at high temperature and humidity, in terms of change ratio [ppm]. The tape has a width of a half inch. Plotting is based on the results of tape width changes calculated as to plural points (top end side of the aluminum ring 112, bottom end side of the aluminum ring 112, and the single resin layer 114) in an axial direction of the reel hub 32 (width direction of the tape).

In the present model, the single resin layer 114 is 2 mm. It can be seen that the tape width change at the single resin layer 114 increases maximally 500 ppm relative to that at the aluminum ring layer 116 (see FIG. 12, at the region where the aluminum ring 112 is present in the cylindrical portion 34).

Figure 14:
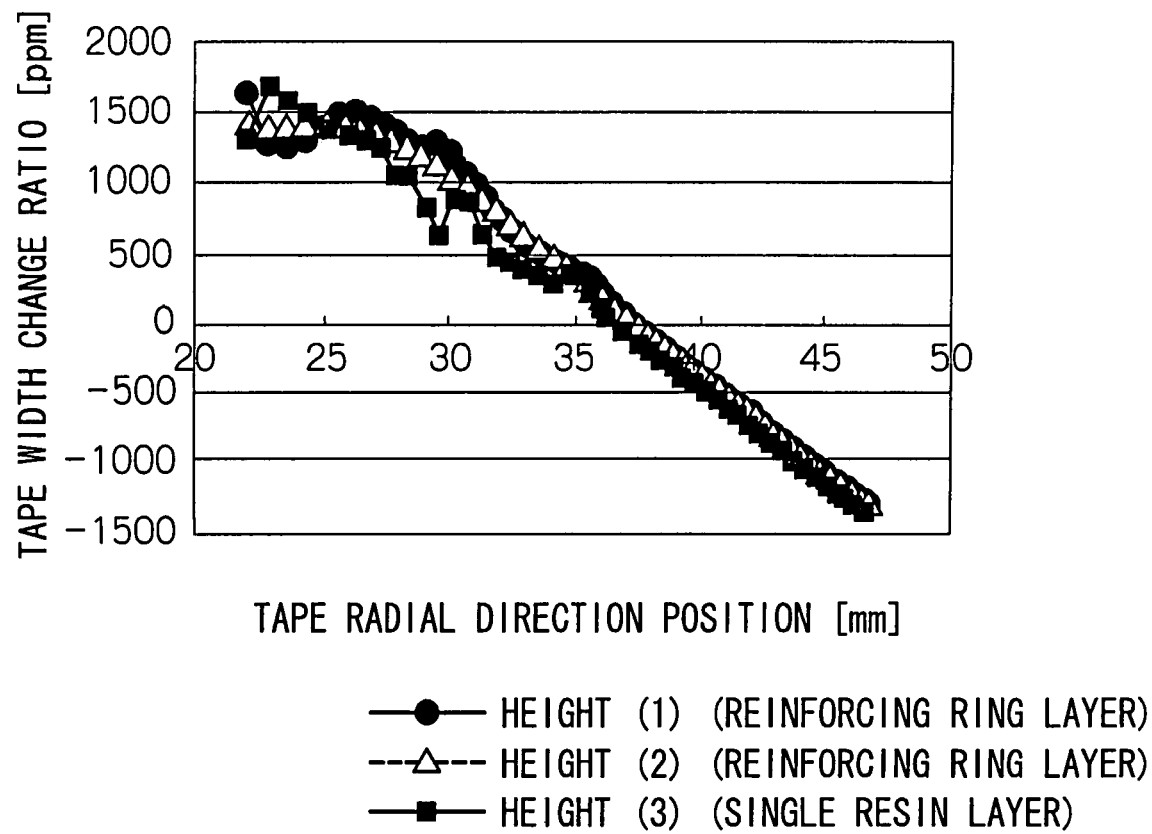
FIG. 14 is a graph showing a tape width change ratio of the recording tape wound on the reel according to the embodiment of the present invention.

The graph of FIG. 14 shows the result of calculation in the case the single resin layer 114 is 1 mm. Where the single resin layer 114 is 1 mm, tape width change is less different at between the single resin layer 114 and the aluminum ring layer 116. It can be seen that the rigidity reduction in the reel hub 32 at the single resin layer 114 has less effects upon the tape width change.

Figure 15:
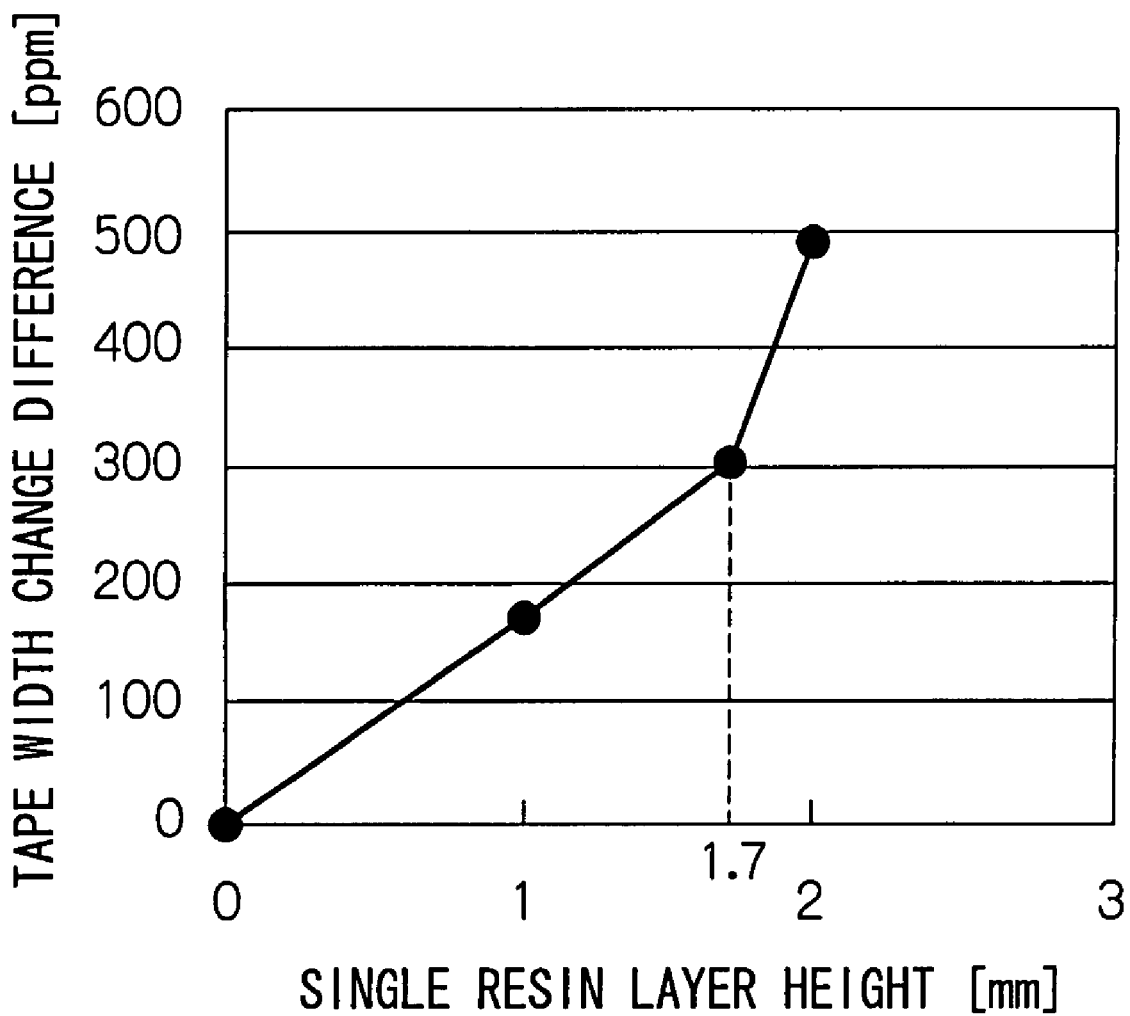
FIG. 15 is a graph showing a tape width change difference of the reel according to the embodiment of the present invention, with respect to a wall thickness of a single resin layer thereof.

FIG. 15 shows a difference of tape width change (width change at the aluminum ring layer 116- width change at the single resin layer 114) with respect to the wall thickness of the single resin layer 114. As the wall thickness of the single resin layer 114 increases, the low rigidity effect at the single resin layer 114 becomes reflected upon the tape width change. It can be seen that the difference of tape width change increases particularly at around the region the single resin layer 114 exceeds 1.7 mm, thus the effect of the single resin layer 114 increases. In order to reduce the tape width change difference at any position in the tape width direction, it can be determined reasonable to design the wall thickness of the single resin layer 114 at 1.7 mm or smaller.

Meanwhile, the single resin layer 114 of polycarbonate requires a wall thickness of approximately 0.8 mm in view of injection molding, as mentioned before. For this reason, it can be seen that the present embodiment desirably provides the single resin layer 114 having a wall thickness $t_2$ of 0.8-1.7 mm.

By thus forming the single resin layer 114 having a wall thickness in a range of 0.8-1.7 mm, the reel hub 32 can be suppressed from partially reducing in its rigidity. This can suppress the partial characteristic deterioration of the recording tape T wound over the reel hub 32 (partial broadening in the width of the recording tape T, etc.) In addition, the reel hub 32 can be reduced of crack occurrence in the single resin layer 114 thereof.

In the meanwhile, in the present embodiment, the reel hub 32 is improved in its rigidity by providing the reel hub 32 with the aluminum ring 112 and integrally forming the cylindrical portion 34 on the outer peripheral surface of the aluminum ring 112, as shown in FIG. 10. The aluminum material desirably possesses a sufficient proof strength in order not to cause a sagging due to the recording tape T being wound tightly.

Figure 16:
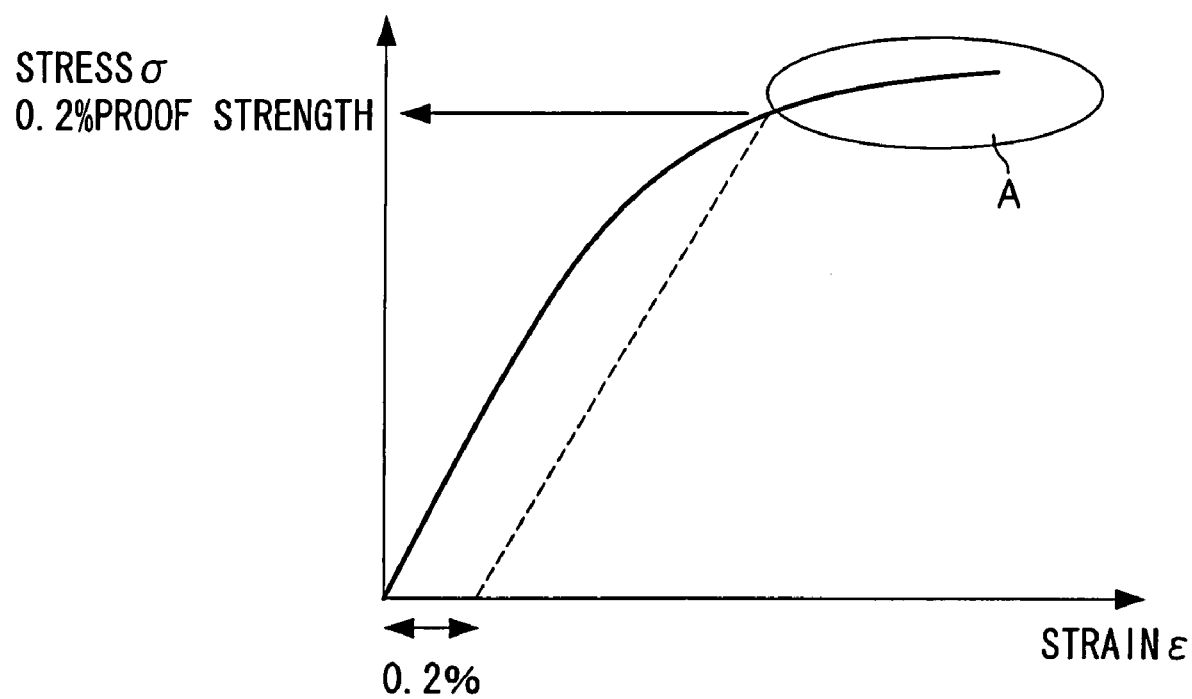
FIG. 16 is a stress-strain diagram of an ordinary material.

FIG. 16 shows a stress-strain diagram of an ordinary material. In order to increase the rigidity of the reel hub 32, there is a need to make the inclination greater in an elasticity region where the inclination is in a straight-line form in the graph. However, it can be seen that, even at a great inclination, in case a stress is applied up to the plasticity region A where the material becomes sagging, the inclination sharply reduces to sharply reduce the substantial rigidity.

Figure 17:
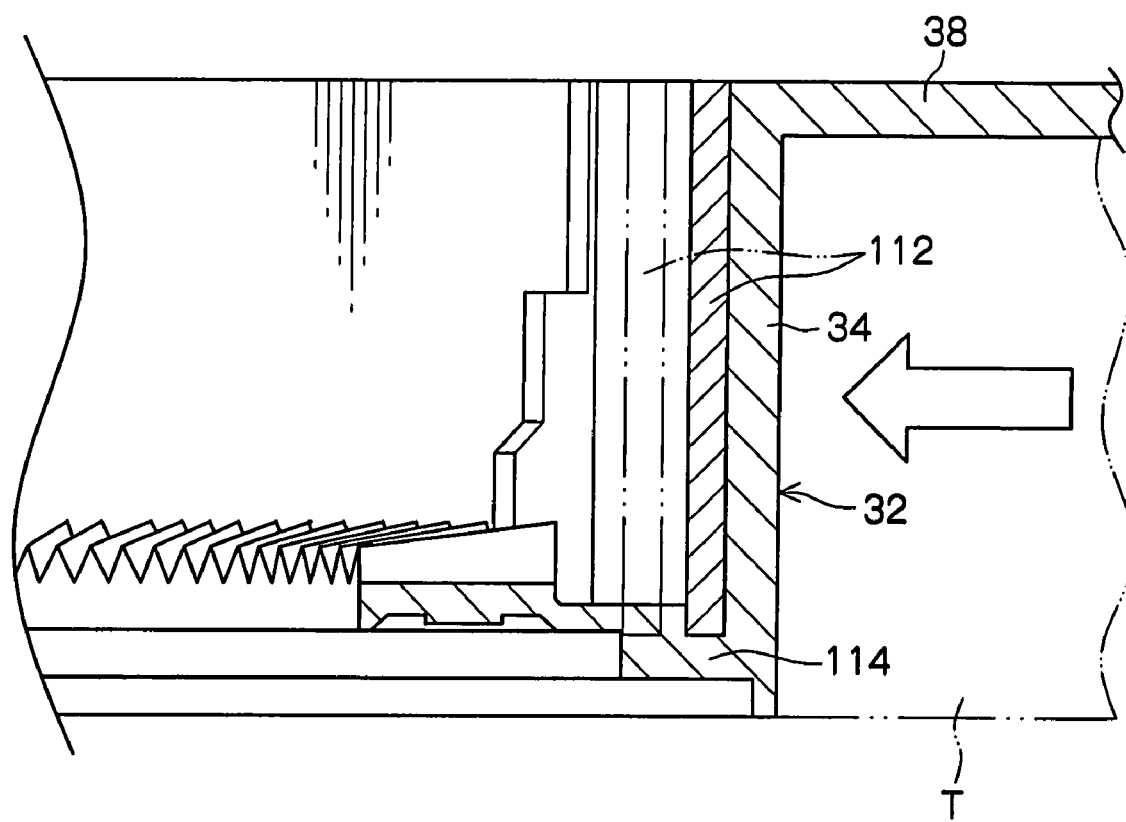
FIG. 17 is an enlarged cross-sectional view explaining a sagging in an aluminum ring of the reel according to the embodiment of the present invention.

Usually, 0.2% proof strength is used as an indicator of elasticity limit of a metal material or the like. This is represented as a stress applied to the material having a plastic strain of 0.2%. When a stress exceeding the 0.2% proof strength (maximum stress the reel hub 32 undergoes) is applied to the reel hub 32, the rigidity of the reel hub 32 lowers sharply by the above reason. Namely, as shown in FIG. 17, a stress exceeding the 0.2% proof strength (tight-winding force, at arrow) if applied causes a sagging in the aluminum ring 112 (shown with a virtual line) and increases the deformation of the reel hub 32.

Meanwhile, Table 1 shows a wall thickness (t) of the aluminum ring 112 and a maximum stress ($\sigma\theta$max.) the reel hub 32 undergoes during the recording tape T is wound tightly. Here, the maximum stress on the reel hub 32 was calculated according to numerical computation on the assumption that the reel hub 32 has an external diameter (hub diameter) of $\phi$44 and the recording tape T has a thickness of 8.9 μm wherein winding is at a tension of 100 gf per a half inch over a tape length of 600 m and exposed in an environment of 60° C. 90% RH over two weeks. In the 60° C. 90% RH environment, a greater stress is applied to the reel hub 32 than that of an RT environment because of the heat contraction of the recording tape T, in which state sagging readily occurs in the reel hub 32.

TABLE 1

| Aluminum wall thickness t (mm) | σθmax. (MPa) |
|---|---|
| 1.0 | 304 |
| 1.2 | 227 |
| 2.5 | 125 |

From Table 1, plotting is made based on the data indicating a relationship between a wall thickness t of the aluminum ring 112 and a maximum stress on the reel hub 32. From this, it can be seen that the maximum stress (0.2% proof strength) on the reel hub 32 attenuates exponentially with respect to the wall thickness t of the aluminum ring. Accordingly, by approximating the data by use of an exponential function according to the least-squares method, the following relationship is obtained:

$$Y=122+2850\times\exp(-2.75\times t) \quad \text{(equation 1)}.$$

Figure 18:
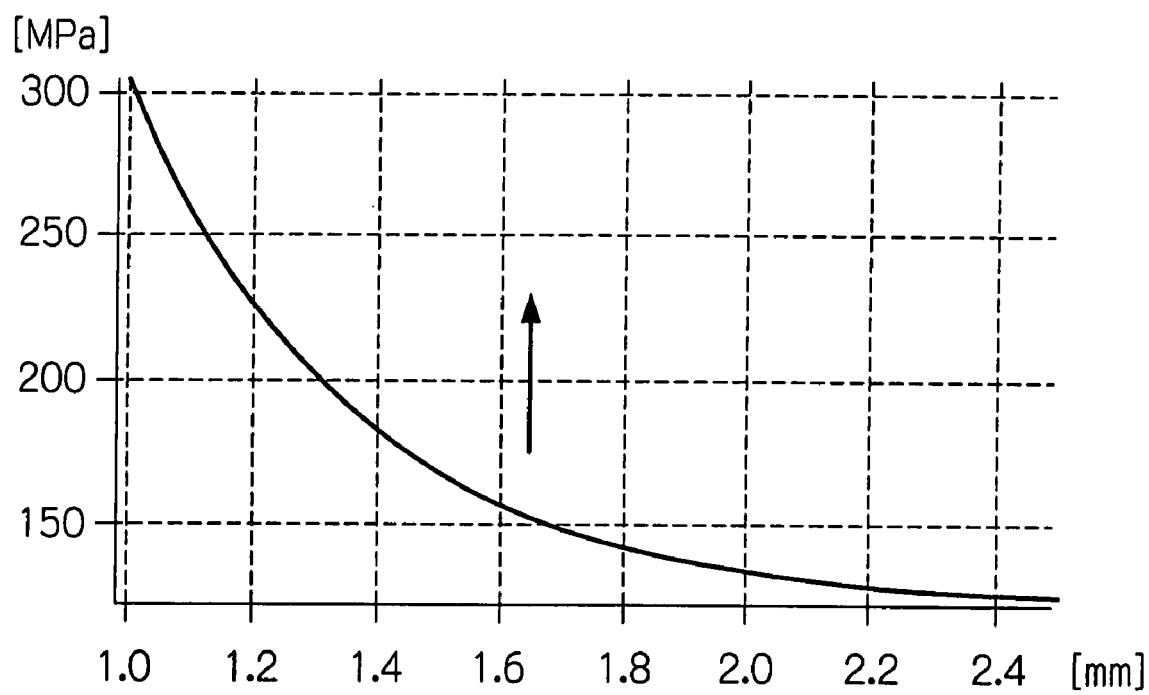
FIG. 18 is an approximation curve indicating a proof strength of the aluminum ring with respect to a wall thickness t of the aluminum ring.

Here, because the strength of the reel hub 32 relies upon the aluminum ring 112, the maximum stress on the reel hub 32 can be replaced as a proof strength of the aluminum ring 112. Due to this, the approximation curve (see FIG. 18) can be considered as a curve indicating a proof strength of the aluminum ring 112 with respect to a wall thickness t of the aluminum ring 112. Accordingly, by using an aluminum material having a proof strength in a region higher than the relevant approximation curve, the aluminum ring 112 can be prevented from undergoing sagging and hence the reel hub 32 can be suppressed from deforming.

Incidentally, equation 1 is for a hub diameter of (φ44 of the reel hub 32. For the smaller hub diameter, the radius of curvature is smaller even if winding is equal in tape length, thus a greater stress is applied to the reel hub 32. It is apparent to require an aluminum material having a proof strength in a region higher than the approximation curve shown in equation 1. Meanwhile, for a greater hub diameter, tape length is generally shorter. It is more secure to an aluminum material having a proof strength in a region higher than the approximation curve shown in equation 1.

From the above, the present embodiment uses an aluminum material having a proof strength of 350 N/mm$^2$ as a material of the aluminum ring 112. With an aluminum material, cost reduction is possible as compared with a titanium material. Meanwhile, because higher circularity is obtainable with an aluminum material as compared with a stainless steel material, the force the recording tape T undergoes from the reel hub 32 is nearly equal upon tightly winding of the recording tape T. Incidentally, the aluminum material is corrosive and hence it is desirable to use one processed for corrosion proof, such as plating, in the surface thereof.

Meanwhile, although the aluminum ring 112 is used as the reinforcing ring, the reinforcing ring may be non-metallic if it enhances the rigidity of the reel hub 32. The material of the cylindrical portion 34 is not limited to polycarbonate (PC) but may be any other resin material allowing for injection molding provided that mechanical strength satisfying the specification of the reel 30 can be obtained.

Meanwhile, in the present embodiment, as shown in FIG. 10, the reel hub 32 and the top flange 38 are integrally formed and the bottom flange 40 is provided with the reel gear 44 meshable with the drive gear 108 of the drive device. Alternatively, the reel gear 44 may be provided on the side of the reel hub 32, though not shown.

Figure 19:
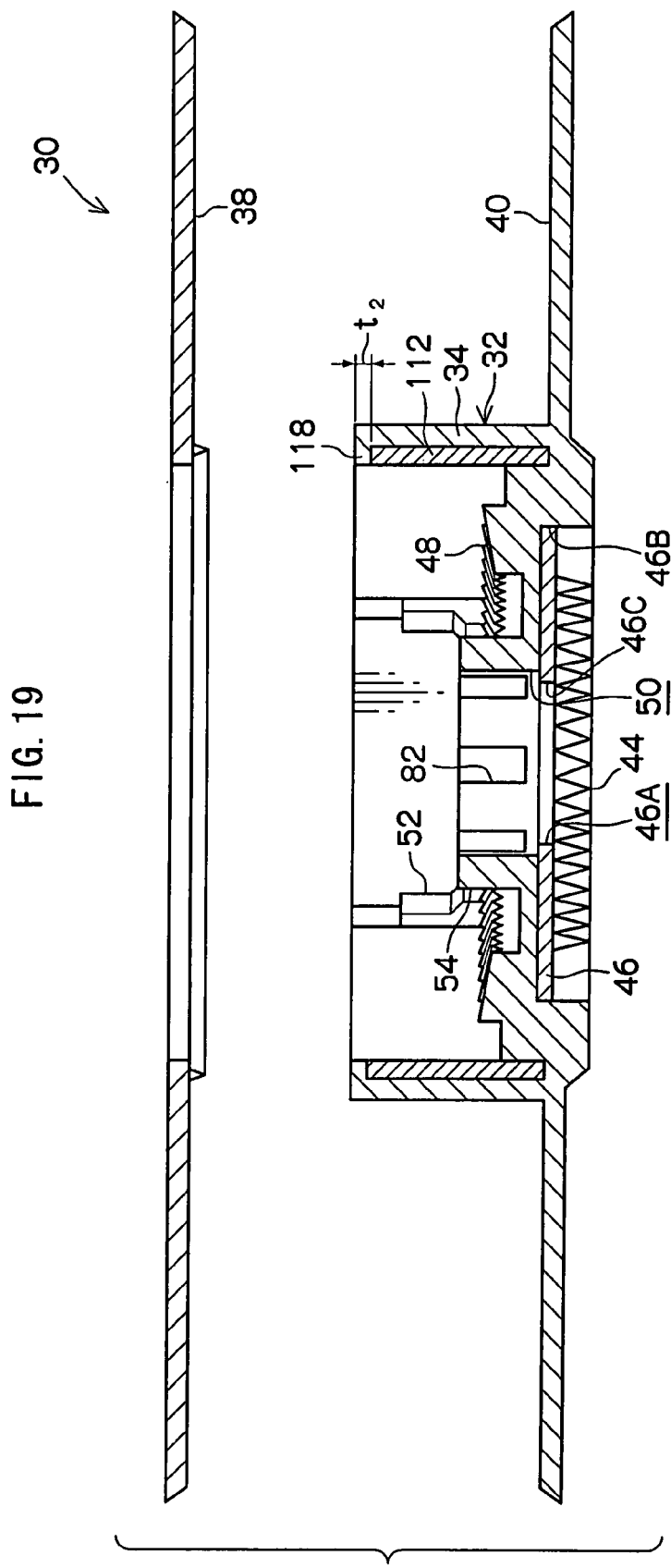
FIG. 19 is a schematic exploded cross-sectional view showing a first modification of the reel structure according to the embodiment of the present invention.

The reel 30 may be such that the reel hub 32 and the bottom flange 40 are integrally formed, as shown in FIG. 19. In this case, the aluminum ring 112 can be provided down to a bottom end portion of the reel hub 32 (region the recording tape T can be wound) on the bottom flange 40 side. Here, a single resin layer 118, to be welded with the top flange 38, is required at the top end side of the reel hub 32. The single resin layer 118 is made in a wall thickness t$_2$ of 0.8-1.7 mm.

Furthermore, the reel 30 may be structured with three parts (three pieces), i.e. the top flange 38, the reel hub 32 and the bottom flange 40, as shown in FIG. 20. Here, the reel hub 32 is provided with a gate G1 through which resin is to be poured into a mold for forming the reel hub 32, at the inside of the aluminum ring 112. In this case, a single resin layer 120 is required for connecting with the cylindrical portion 34 provided at the outside of the reel hub 32. The single resin layer 120 is made in a wall thickness t$_2$ of 0.8-1.7 mm.

The through hole 46A is formed for the clutch member 84 to move as shown in FIG. 2. However, in the type such a through hole 46A is not formed, the gate for the mold can be provided at the central portion of the reel hub 32, though not shown. This allows the resin to broaden radially about the gate thus being filled in the mold, causing less weld (joining of resin), etc. and improving the strength of the reel 30.

Further, the recording tape cartridge 10 of the above embodiment is configured with the leader block 28 as the leader member, but the recording tape cartridge 10 is not limited to the above embodiment. For example, a configuration with a leader pin in the shape of column (not illustrated) as the leader member is possible, and a configuration with a cover member for opening and closing the opening 18 (a slide door or the like that moves along a predetermined straight line or arc, not illustrated) is possible. Furthermore, it is sufficient that the recording tape T is a long tape-shaped information recording/reproducing medium that is able to record information or reproduce recorded information, and the recording tape cartridge 10 (reel 30) may be applied to the recording tape T of any recording and reproducing format.

Although the above embodiments shows the examples the reel 10 is applied to a recording tape cartridge 12 receiving a single reel in a case 14, the present invention is not limited to this, e.g. the reel 10 may be applied to a two-reel-type recording tape cartridge receiving two reels in the case.

The present invention provides a reel capable of improving the rigidity of the hub and maintaining the tape characteristics.

A first aspect of the present invention provides a reel comprising: a hub with a recording tape wound thereon and reinforced by a reinforcing ring; and a pair of flanges provided at both end portions of the hub that hold end portions in a width direction of the recording tape, wherein the hub has a resin layer at which the reinforcing ring is not present, and the length of the resin layer in an axial direction of the hub is 0.8-1.7 mm.

According to the above-described aspect, the rigidity of the hub is improved by reinforcing the hub with a reinforcing ring. If the reinforcing ring is formed by being inserted in a mold (insert molding), such as when the hub and the top or bottom flange are integrated, a resin layer where the reinforcing ring is not present is formed in an axial direction of the hub. This resin layer has a wall thickness (a length in an axial direction of the hub) of 0.8-1.7 mm.

Namely, the region where the reinforcing ring is not present is defined in size in an axial direction of the hub. In case the resin layer has a wall thickness in a range of 0.8-1.7 mm in this manner, the partial rigidity reduction of the hub can be suppressed. This can suppress the partial characteristic deterioration (partial broadening of a recording tape width, etc.) of the recording tape wound over the hub. Besides, crack occurrence can be reduced in the resin layer of the hub.

In the above-described aspect, the reinforcing ring may be an aluminum ring.

According to the above-described aspect, cost reduction can be achieved by making the reinforcing ring as an aluminum ring, as compared with a titanium material or the like. Meanwhile, higher circularity is obtainable as compared to a stainless steel material, thus providing nearly equal stress applied from the hub to the recording tape when tightly winding of the recording tape.

In the above-described aspect, the aluminum ring may have a proof strength greater than $122+2850\times\exp(-2.75\times t)$ with respect to a wall thickness t of the aluminum ring.

According to the above-described aspect, by providing the aluminum ring with a proof strength greater than $122+2850\times\exp(-2.75\times t)$ with respect to a wall thickness t of the aluminum ring, the hub can be suppressed from deforming without a sagging of aluminum when tightly winding of the recording tape.

As described above, the present invention can improve the rigidity of the hub and maintain the tape characteristics.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reel comprising:
    a hub with a recording tape wound thereon and reinforced by a reinforcing ring; and
    a pair of flanges provided at both end portions of the hub that hold end portions in a width direction of the recording tape,
    wherein the hub has a resin layer at which the reinforcing ring is not present, and the length of the resin layer in an axial direction of the hub is 0.8-1.7 mm.

2. The reel according to claim 1, wherein the reinforcing ring is an aluminum ring.

3. The reel according to claim 2, wherein the aluminum ring has a proof strength greater than $122=2850\times\exp(-2.75\times t)$ with respect to a wall thickness t of the aluminum ring.

4. The reel according to claim 1, wherein the hub includes a cylindrical portion.

5. The reel according to claim 4, wherein the cylindrical portion of the hub has a hub thickness in a radial direction of the hub of 1 mm.

6. The reel according to claim 4, further comprising:
    a brake member provided inside the reinforcing ring for moving between an unlocked position and a locked position for stopping rotating of the hub when the reel is not in use;
    a rib extending along a portion of the hub in the axial direction from an internal surface of the reinforcing ring toward the outer periphery of the brake member for restricting movement of the brake member in a radial direction when the brake member is in the locked position.

7. The reel according to claim 6, wherein the rib includes a cutout on an upper end of the rib for providing clearance for a movement of the brake member in the radial direction when the brake member is in the unlocked position.

8. The reel according to claim 1, wherein the reinforcing ring has a ring thickness in a radial direction of the hub of 1 mm.

* * * * *